(12) United States Patent
Imai

(10) Patent No.: US 7,647,501 B2
(45) Date of Patent: Jan. 12, 2010

(54) COMMUNICATIONS APPARATUS, COMMUNICATIONS SYSTEM, AND METHOD OF SETTING CERTIFICATE

(75) Inventor: Tatsuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 702 days.

(21) Appl. No.: 10/937,309

(22) Filed: Sep. 10, 2004

(65) Prior Publication Data
US 2005/0097332 A1 May 5, 2005

(30) Foreign Application Priority Data

Sep. 12, 2003 (JP) ............... 2003-321762
Jul. 20, 2004 (JP) ............... 2004-211396

(51) Int. Cl.
*H04L 9/32* (2006.01)
(52) U.S. Cl. ............... 713/175; 713/173; 713/176; 380/277
(58) Field of Classification Search ......... 713/173, 713/175, 176; 380/277
See application file for complete search history.

(56) References Cited

U.S. PATENT DOCUMENTS

| | | | | |
|---|---|---|---|---|
| 5,781,723 | A * | 7/1998 | Yee et al. ............... | 726/20 |
| 5,796,840 | A * | 8/1998 | Davis ............... | 705/51 |
| 5,805,712 | A | 9/1998 | Davis | |
| 6,026,166 | A * | 2/2000 | LeBourgeois ............... | 713/156 |
| 6,314,521 | B1 | 11/2001 | Debry | |
| 6,513,116 | B1 * | 1/2003 | Valente ............... | 713/155 |
| 6,950,941 | B1 * | 9/2005 | Lee et al. ............... | 713/193 |
| 6,985,583 | B1 * | 1/2006 | Brainard et al. ............... | 380/44 |
| 7,047,414 | B2 * | 5/2006 | Wheeler et al. ............... | 713/176 |
| 7,058,807 | B2 * | 6/2006 | Grawrock et al. ............... | 713/172 |
| 7,152,158 | B2 * | 12/2006 | Watanabe et al. ............... | 713/156 |
| 2003/0172308 | A1 | 9/2003 | Imai | |
| 2003/0223766 | A1 | 12/2003 | Imai | |
| 2004/0153649 | A1 * | 8/2004 | Rhoads et al. ............... | 713/176 |

FOREIGN PATENT DOCUMENTS

JP 2002-251492 9/2002
JP 2002-353959 12/2002

OTHER PUBLICATIONS

U.S. Appl. No. 10/667,306, filed Sep. 23, 2003, Imai.
U.S. Appl. No. 10/366,610, filed Feb. 14, 2003, Imai.
U.S. Appl. No. 10/392,861, filed Mar. 21, 2003, Imai.

* cited by examiner

*Primary Examiner*—Michael J Simitoski
*Assistant Examiner*—Amare Tabor
(74) *Attorney, Agent, or Firm*—Oblon, Spivak, McClelland, Maier & Neustadt, L.L.P.

(57) ABSTRACT

An apparatus for communicating, including a communicating unit that enables the apparatus to communicate with a communications counterparty via the communicating unit. The communicating unit includes a unit for providing an individual certificate that is a digital certificate being provided with information identifying the apparatus for communicating in order to receive an authentication by the communications counterparty when communicating, and a unit for communicating when having been authenticated with the individual certificate by the communications counterparty. The apparatus further includes at least one storage area for storing the individual certificate and a common certificate that is a digital certificate not being provided with apparatus identifying information, in a replacement component as a minimum unit enabled for replacement.

16 Claims, 20 Drawing Sheets

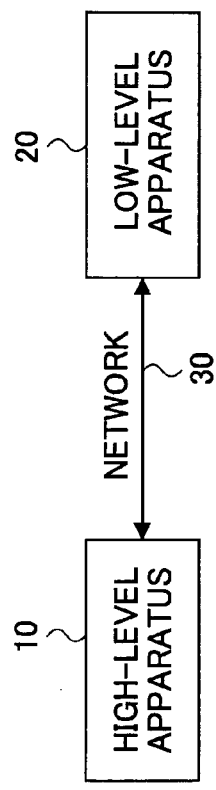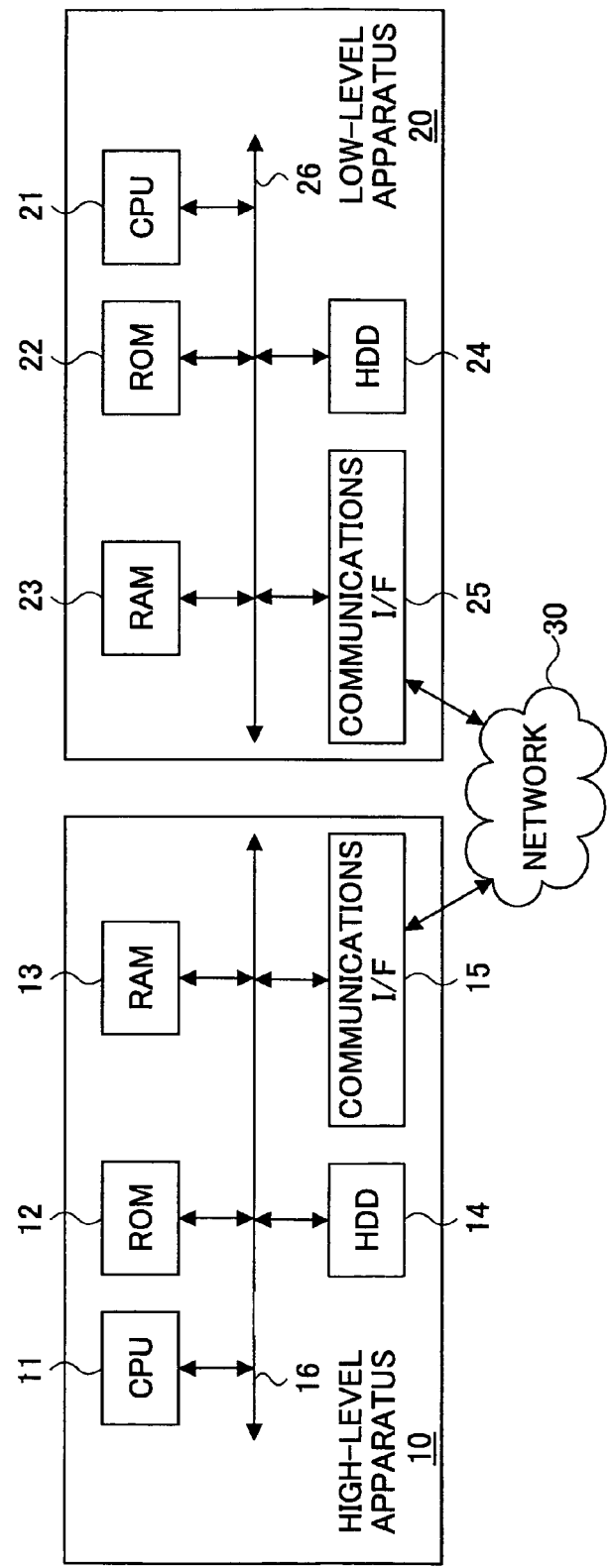

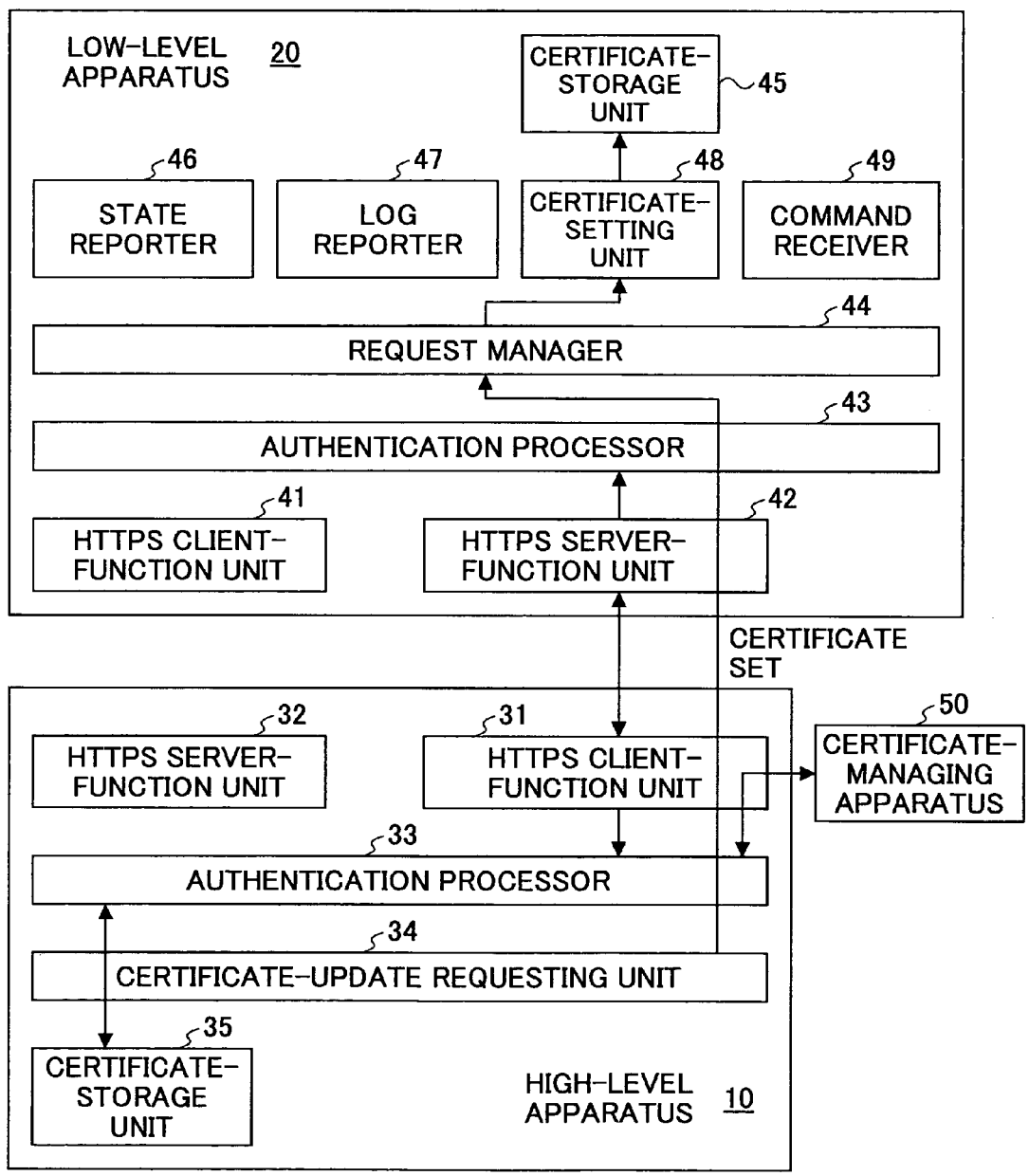

FIG.4

| | OBTAIN STATE | OBTAIN LOG | SET CERTIFICATE | EXECUTE COMMAND |
|---|---|---|---|---|
| COMMON CERTIFICATE | NO | NO | YES | NO |
| INDIVIDUAL CERTIFICATE | YES | YES | YES | YES |

FIG.16

AICOO IMAGE-FORMING APPARATUS TYPE-1

| VOLTAGE RATING | POWER CONSUMPTION RATING | CURRENT RATING | MACHINE-TYPE CODE |
|---|---|---|---|
| DC12V | 3VA | 0.25A | H100-00 |

SERIAL MACHINE NUMBER  8909-123456

BAR CODE ~BC

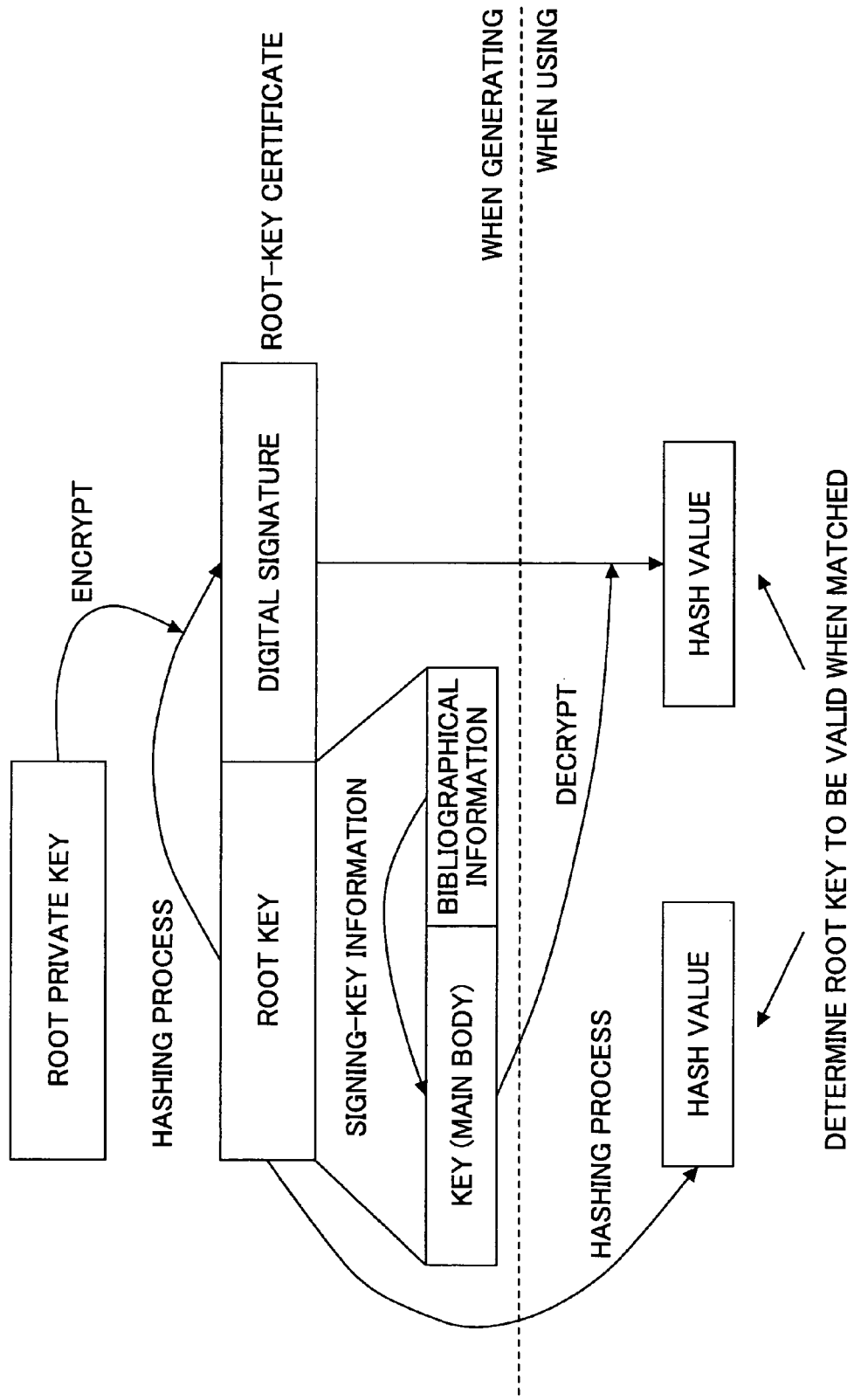

COMMUNICATIONS APPARATUS, COMMUNICATIONS SYSTEM, AND METHOD OF SETTING CERTIFICATE

TECHNICAL FIELD

The present invention generally relates to a technology for communicating and more specifically relates to a communications apparatus provided with communicating means and enabled to communicate with a communications counterparty with the communicating means, a communications system provided with a low-level apparatus as such a communications apparatus and a high-level apparatus to be the communications counterparty, and a method of setting a certificate into such a communications apparatus.

BACKGROUND ART

Up to now, connecting multiple communications apparatuses, each of which is provided with a communications function, to enable communicating via a network and building various systems have been carried out. As an example, there is a so-called electronic commerce system such that orders for products are transmitted from a computer such as a PC which functions as a client apparatus and those orders are received in a server apparatus enabled to communicate with this client apparatus over the Internet. Moreover, a system is being proposed such that each of the various electronic apparatuses is made to have a function of the client apparatus or the server apparatus so as to be connected via a network, and remote control of the electronic apparatuses is performed by means of mutual communications.

In building such a system, it is important to confirm when communicating, for instance, whether the communications counterparty is appropriate, or whether information having been transmitted is being manipulated. Moreover, especially when communicating over the Internet, there is also a demand for making sure that, when transmitting confidential information, the contents are not viewed stealthily, as the information often passes through unrelated computers before reaching the communications counterparty. Then, as a communication protocol that responds to such a demand, for example, a protocol called SSL (Secure Socket Layer) has been developed and is being widely used. Communicating using this protocol enables combining a public-key encrypting method and a common-key encrypting method, authenticating the communications counterparty, as well as preventing manipulating and eavesdropping by means of encrypting the information. Moreover, also at the communications-counterparty side, authenticating an apparatus of a communications source having requested communications is enabled.

As technologies related to such authentication using the SSL and the public-key encrypting, there are, for example, those as described in the Patent Documents 1 and 2.

Patent Document 1
JP 2002-353959A
Patent Document 2
JP 2002-251492A

Herein, a procedure for communicating when performing mutual authentication according to this SSL is described, focusing on an authentication process. FIG. 18 is a flowchart of a process for each apparatus when a communications apparatus A and a communications apparatus B are performing mutual authentication according to the SSL, together with information used in the process.

As illustrated in FIG. 18, when performing mutual authentication according to the SSL, it is necessary to have stored in both communications apparatuses a root-key certificate, a private key and a public-key certificate. This private key is a private key that is issued to each apparatus by a CA (Certificate Authority), and the public-key certificate is one which the CA has provided as a digital certificate as the CA affixes a digital signature to a public key corresponding to the private key so as to be made a digital certificate. Moreover, the root-key certificate is one which the CA has provided as a digital certificate with a root key corresponding to a private root-key that the CA has used for the digital signature so as to be made a digital certificate.

FIGS. 19A and 19B illustrate a relationship among these keys.

As illustrated in FIG. 19A, a public key A is configured with a key main-body for decrypting a document encrypted using a private key A, and bibliographical information including information on a source (CA) of the public key and an expiry date, etc. Then, the CA, in order to indicate that the key main-body and the bibliographical information are not manipulated, has a hash value obtained by hashing the public key A encrypted using the private root-key for providing to a client public-key as a digital signature. Moreover at this time, identifying information identifying the private root-key is added as signing-key information to bibliographical information on the public key A. Then, the public-key certificate being provided this digital signature is a public-key certificate A.

When using this public-key certificate A for an authentication process, the digital signature included therein is decrypted using a key main-body of the root key as a public key corresponding to the private root-key. When this decrypting is performed successfully, it is known that the digital signature surely has been provided by the CA. Moreover, when the hash value obtained by hashing a part of the public key A, and the hash value obtained by decrypting match, it is known that the key main-body also has not been damaged or manipulated. Furthermore, when the received data can be decrypted successfully using this public key A, it is known that the data are those transmitted from a holder of the private key A.

Herein, in order to perform an authentication, while it is necessary to store a root key in advance, this root key, as illustrated in FIG. 19B, is also made to be stored as a root-key certificate with the CA having provided the digital signature. This root-key certificate is in a form of a self-signature such that decrypting of a digital signature with a public key contained in the certificate itself is enabled. Then, when using the root key, the digital signature is decrypted by using the key main-body included in the root-key certificate for comparing with the hash value obtained by hashing the root key. When these are matched, it is confirmed that the root key is not damaged, etc.

The flowchart in FIG. 18 is now described. It is noted that, in FIG. 18, with arrows between two flowcharts denoting data transfer, the transmitting side performs a transfer process in a step originating the arrow, and the receiving side, once receiving the information, performs a process in a step to which the arrow points. Moreover, when the process in each step is not successfully completed, a response indicating an unsuccessful authentication is returned at that time so as to suspend the process. The same applies when the response indicating the unsuccessful authentication is received from the communications counterparty, or when a timeout of the process is reached, etc.

Herein, assuming that a communications apparatus A requests communications with a communications apparatus B, when performing the request, a CPU of the communications apparatus A executing required control programs starts the process in the flowchart illustrated at the left in FIG. 18. Then, in Step S11, a connection request is transmitted to the communications apparatus B.

On the other hand, a CPU of the communications terminal B, once receiving the connection request, executing required control programs, starts the process in the flowchart illustrated at the right in FIG. 18. Then, in Step S21 a first random number is generated for encrypting using a private key B. Then, in Step S22 the encrypted first random number and a public-key certificate B are transmitted to the communications apparatus A.

At the communications apparatus A side, once receiving this, Step S12 confirms the validity of the public-key certificate B using a root-key certificate.

Then once having confirmed validity, in Step S13, the first random number is decrypted using a public key B included in the received public-key certificate B. When the decrypting is successful, confirming that the first random number has surely been received from a subject of issuance of the public-key certificate B is enabled.

Subsequently, in Step S14 further a second random number and a common-key seed are generated. The common-key seed may be generated, for example, based on data transacted in prior communications. Then, in Step S15 the second random number is encrypted using a private key A, and the common-key seed is encrypted using the public key B, for transmitting these along with a public-key certificate A to a server apparatus. The encrypting of the common-key seed is performed in order to make sure that the common-key seed is not known to an apparatus other then the communications counterparty.

Moreover, in the next Step S17, a common key for use in encrypting subsequent communications is generated from the common-key seed generated in Step S14.

At the communications apparatus B side, once receiving data having been transmitted in Step S16 from the communications apparatus A, in Step S23 the validity of the public-key certificate A is confirmed using a root-key certificate. Then once confirmed, in Step S24, the second random number is decrypted using the public key A included in the received public-key certificate A. When the decrypting is successful herein, confirming that the second random number is surely received from a subject of issuance of the public-key certificate A is enabled.

Subsequently, in Step S25 the common-key seed is decrypted using a private key B. In the processes thus far, the common-key seed has been shared at the communications apparatus A side and at the communications apparatus B side. Then, the common-key seed does not become known to an apparatus other than the communications apparatus A having generated the seed and the communications apparatus B having the private key B. When the processes thus far are successful, also at the communications apparatus B side in Step S26, a common key for use in encrypting subsequent communications is generated from the common-key seed obtained in the decrypting.

Then, once the processes of Step S17 at the communications apparatus A side and Step S26 at the communications apparatus B side are completed, a success of authentication and an encrypting method for use in subsequent communications are mutually confirmed and the process regarding the authentication is terminated assuming that subsequent communications are performed with the encrypting method using the common key generated. It is noted that, in this confirmation, a response from the communications apparatus B that an authentication has succeeded is also included. The processes as described above enable mutual establishing of communications, and, subsequently, encrypting of data by means of a common-key encrypting method, using the common key generated in Step S17 or S26 so as to perform the communications.

Performing such processes enables the communications apparatuses A and B to securely share a common key and to establish a route for communicating securely.

It is to be noted that, in the processes as described above, it is not mandatory to encrypt the second random number with the public key A, and to transmit the public-key certificate A to the communications apparatus B. In this case, the processes of Steps S23 and S24 at the communications apparatus B side are not needed so that the process becomes as illustrated in FIG. 20. In such a way, while the communications apparatus B cannot authenticate the communications apparatus A, this process is sufficient when only the communications apparatus A authenticating the communications apparatus B suffices. Then in this case, it is necessary to have only the root-key certificate, and not the private key A and the public-key certificate A, stored in the communications apparatus A. Moreover, it is not necessary to have the root-key certificate stored in the communications apparatus B.

Now, when performing the authentication process as described above, two levels are possible for the authentication criteria. A first level determines whether equipment of a communications counterparty fulfills certain criteria such as whether it is supplied from the same vendor, or whether it has passed a certain test, whereas a second level specifies an individual equipment unit of the communications counterparty.

Then, when performing the first-level authentication, it suffices to have a common set of a public-key certificate and a private key stored in equipment fulfilling certain criteria, to use the stored common set to perform the authentication at the time of SSL communications and for the communications counterparty to be able to confirm as surely that it is an apparatus of issuance of the public-key certificate. Therefore, there is no need to replace equipment-specific identifying information (ID), etc.

Moreover, even when performing the second level authentication, it is possible that, after establishing a secure communications route using, for example, the same key as in the case of the first-level authentication as described above, an ID is made to be transmitted in order to specify a communications counterparty, for use in the authentication.

Herein, when operating a communications system for having communications conducted between communications apparatuses, in case it is envisioned that there is to be no operator near the apparatuses, there is a demand such that specifying of an apparatus is performed with the communications. Then, in order to fulfill such a demand, a mechanism for guaranteeing that the apparatus specified with the communications is surely the apparatus is needed. In other words, the second-level authentication as described above is needed.

However, in the method as described above such that after the secure communications route is established the ID is made to be transmitted so as. to specify the communications counterparty, a need arises to separately manage the ID with an application from the authentication process according to the SSL.

Moreover, when the common public-key certificate and the private key are leaked, a third party having obtained the leaked information may disguise itself as any equipment having a detectable ID, seriously compromising the security of the communications. Then in this case, the security of the communications cannot be recovered unless keys of all equipment units are updated, the task requiring a great deal of effort.

Then, in order to solve this issue, a public-key certificate and a private key are issued per apparatus, and information identifying the apparatus is provided in bibliographical information of the public-key certificate, such that when confirming the validity of the public-key certificate the identifying information having been included in the bibliographical information is referred to so as to confirm that a counterparty having transmitted the certificate (a subject apparatus of issuance of the certificate) is an appropriate communications counterparty. In such a case, as a different pair of the public-key certificate and the private key is made to be stored for each apparatus, even when a key of one equipment unit is leaked, the third party disguising is possible only as the one equipment unit, and when the key of the one equipment unit is updated, maintaining the communications again in a secure state is enabled.

Now, when authenticating an apparatus, as a matter of course an authentication that specifies the apparatus is needed, which is different from authentication that specifies an operator of a Web browser, etc. Thus, while there is a need to have a digital certificate stored in advance in the apparatus, when a component storing the digital certificate is replaced, the digital certificate ends up being dropped with the component. Thus, the authentication of the apparatus cannot be performed. Therefore, when using a public-key certificate provided with information identifying an apparatus, a problem would occur when a need arises to replace a component storing the digital certificate due to damage or a failure, etc.

Although there is no problem when the digital certificate is still being stored in a replaced component, it is not desirable that identifying information for use in the replacing component be changed, in order to specify an equipment unit or a user. However, in order to have a public-key certificate provided in the replacing component with the same identifying information as the replaced component, information identifying an apparatus to be receiving the replacing component at the time of manufacturing is needed, making it impossible to have in advance a component ready to be the replacing component having recorded a new public-key certificate. Therefore, there is a problem such that manufacturing is done as needed only after the apparatus requiring the replacing component becomes known, which imposes an extremely inefficient production system.

Moreover, there is a problem such that as components cannot be supplied speedily, the apparatus needs to be kept for a certain period in a state of not being able to successfully perform an authentication process according to the SSL, making it impossible to maintain, during the period of replacing a component, a secure communications channel for the apparatus.

While it is possible to have separately stored the public-key certificate and the private key after replacing the component, in a state without such stored information, successful performing of the authentication process according to the SSL cannot be done, making impossible the maintaining of a secure communications route for the apparatus having replaced a component. Thus, in order to securely distribute a new public-key certificate, etc., there is a need to store it in a recording medium so as to be sent by post to an installation site of the apparatus or brought by a representative servicing the replacing of the component. However, even in having this recording medium ready, there is a problem that is the same as in the case of component manufacturing as described above.

Furthermore, in order to prevent a disguising, etc. of an apparatus, for the digital certificate, there is a need to prevent a malicious user replacing, reading or registering, and a need to prevent a general user from updating a digital certificate, making difficult the confirming of privileges when manually setting the digital certificate.

DISCLOSURE OF THE INVENTION

Accordingly, it is a general object of the present invention to provide a technology for communicating that substantially obviates one or more problems caused by the limitations and disadvantages of the related art.

It is a more particular object of the present invention to provide a communications apparatus, a communications system, and a method of setting a certificate that enable, while maintaining security, even when there arises a need to replace a component for storing a certificate needed for an authentication, recovering to the state of being able to perform a successful authentication easily and speedily.

According to the invention, an apparatus for communicating includes communicating means that is enabled to communicate with communications counterparties via the communicating means, wherein the communicating means, including means for providing an individual certificate that is a digital certificate being provided with information identifying the apparatus for communicating in order to receive an authentication by the communications counterparty when communicating, is means for communicating when having been authenticated with the individual certificate by the communications counterparty, and the apparatus for communicating further includes a storage area for storing the individual certificate and a common certificate that is a digital certificate not being provided with apparatus-identifying information, in a replacement component as a minimum unit enabled for replacement.

The apparatus for communicating in an embodiment of the invention enables, while maintaining security, even when there arises a need to replace a component for storing a certificate needed for an authentication, recovering to the state of being able to perform a successful authentication easily and speedily.

According to another aspect of the invention, a system for communicating includes a high-level apparatus and low-level apparatuses to be communications counterparties of the high-level apparatus, wherein the low-level apparatus includes means for providing an individual certificate that is a digital certificate being provided with information identifying the low-level apparatus in order to receive an authentication by the communications counterparty when communicating, and includes communicating means for communicating when having been authenticated with the individual certificate by the communications counterparty, and the low-level apparatus further includes a storage area for storing the individual certificate and a storage area for storing a common certificate that is a digital certificate not being provided with apparatus-identifying information in a replacement component as a minimum unit enabled for replacement.

The system for communicating in an embodiment of the invention enables, while maintaining security, even when there arises a need to replace a component for storing a certificate needed for an authentication, recovering to the state of being able to perform a successful authentication easily and speedily.

According to yet another aspect of the invention, a method of setting a certificate for setting, in an apparatus for communicating including communicating means enabled to communicate with communications counterparties via the communicating means, an individual certificate that is a digital certificate being provided with information identifying the apparatus for communicating, includes the steps of installing in the apparatus for communicating a replacement component as a minimum unit enabled for replacement having been provided with a storage area for storing the individual certificate and a storage area for storing a common certificate that is a digital certificate not being provided with apparatus-identifying information, in the state of having the common certificate to be stored and not having the individual certificate to be stored, and having the apparatus for communicating, to provide the common certificate in order to receive an authentication by the communications counterparties when communicating and to obtain via the communicating means the individual certificate from the communications counterparty so as to have the obtained individual certificate stored in the storage area for storing the individual certificate when having been authenticated with the common certificate by the communications counterparty.

The method of setting a certificate in an embodiment of the invention enables, while maintaining security, even when there arises a need to replace a component for storing a certificate needed for an authentication, recovering to the state of being able to perform a successful authentication easily and speedily.

BRIEF DESCRIPTION OF THE DRAWINGS

Other objects, features, and advantages of the present invention will become more apparent from the following detailed description when read in conjunction with the accompanying drawings, in which:

FIG. 1 is a block diagram illustrating a configuration of an embodiment of a communications system according to this invention;

FIG. 2 is a block diagram illustrating hardware configurations of a high-level apparatus and a low-level apparatus as illustrated in FIG. 1;

FIG. 3 is a functional block diagram illustrating a functional composition of a portion related to remote control and setting of a certificate of the high-level apparatus and low-level apparatus in FIG. 2;

FIG. 4 is a table illustrating determining criteria on whether to execute an operation in a request manager as illustrated in FIG. 3;

FIG. 16 is a diagram illustrating an example of a rating plate for mounting when assigning an identification number to an apparatus having passed a functional test;

FIG. 19B is another diagram for describing a relationship among the private root-key, the root key, and a root-key certificate in the authentication process illustrated in FIG. 18.

BEST MODE FOR CARRYING OUT THE INVENTION

Descriptions are given next, with reference to the accompanying drawings, of a preferred embodiment of the present invention.

First, a configuration of an embodiment of a communications apparatus according to the invention and an embodiment of a communications system of the invention that is configured using the communications apparatus is described.

FIG. 1 is a block diagram illustrating a configuration of the communications system.

The communications system, as illustrated in FIG. 1, is configured with a high-level apparatus 10 and a low-level apparatus 20, each of which is provided with communicating means, that are connected via a network 30. Then, the low-level apparatus 20 is the embodiment of the communications apparatus of the invention. Moreover, the high-level apparatus 10 is also a communications apparatus provided with a communications function and becomes a communications counterparty of the low-level apparatus 20.

Figure 17:
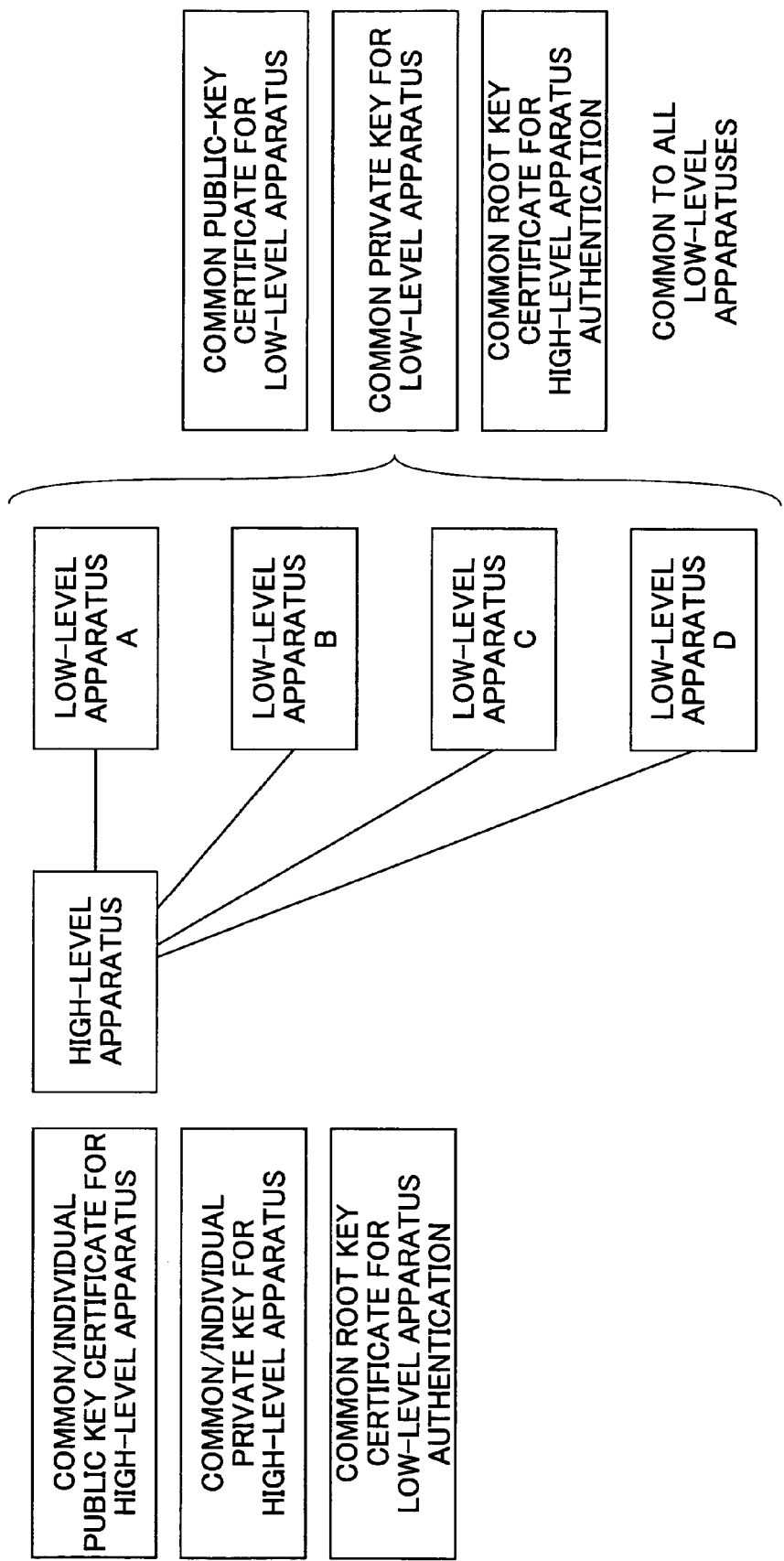
FIG. 17 is a diagram for describing a configuration when multiple low-level apparatuses are provided, for the communications system as illustrated in FIG. 1.

As for the network 30, which may be wired or wireless, various communications circuits (communications routes), enabling building of the network, may be adopted. Moreover, herein while only one low-level apparatus 20 is illustrated, it is possible to provide multiple low-level apparatuses 20 within the communications system as illustrated in FIG. 17.

For such a communications system, first hardware configurations of the high-level apparatus 10 and the low-level apparatus 20 are described. A simplified illustration of the hardware configurations of the high-level apparatus 10 and the low-level apparatus 20 is such as illustrated in FIG. 2.

As illustrated in FIG. 2, the high-level apparatus 10 is provided with a CPU 11, a ROM 12, a RAM 13, a HDD 14, and a communications interface (I/F) 15, which are connected with a system bus 16. Then, the CPU 11 executing various control programs being stored in the ROM 12 and the HDD 14 controls an operation of the high-level apparatus 10, and implements functions of authenticating the communications counterparty and updating of a digital certificate of the low-level apparatus 20, etc. It is noted in the description that the digital certificate denotes digital data having been provided with a signature in order to prevent counterfeiting.

The low-level apparatus 20, in the same manner as the high-level apparatus 10, is provided with a CPU 21, a ROM 22, a RAM 23, a HDD 24, and a communications interface (I/F) 25, which are connected with a system bus 26. The CPU 21 executing as needed various control programs being stored in the ROM 22 and the HDD 24, and performing control of the apparatuses, enables implementing of functions as various means such as communicating means, individual certificate setting means, etc.

It is noted that, in the communications system, it is a matter of course that various configurations may be adopted depending on objectives of remote control or electronic commerce, etc. Then, as hardware for the high-level apparatus 10 and the low-level apparatus 20, a known computer model as appropriate may be adopted. It is a matter of course that other hardware may be added as needed so that it is not necessary for the high-level apparatus 10 and the low-level apparatus 20 to have the same configuration.

Next, as a portion related to the features of the embodiment out of the communications system, a functional configuration of a portion related to setting of a certificate of the high-level apparatus 10 and low-level apparatus 20 is illustrated in FIG. 3. The functions in the high-level apparatus 10 are implemented by the CPU 11 of the high-level apparatus 10 executing required control programs being stored in the ROM 12 and the HDD 14, while the functions in the low-level apparatus 20 are implemented by the CPU 21 of the low-level apparatus 20 executing required control programs being stored in the ROM 22 and the HDD 24, etc.

As illustrated in FIG. 3, the high-level apparatus 10 is provided with a HTTPS (Hyper Text Transfer Protocol Security) client-function unit 31, a HTTPS server-function unit 32, an authentication processor 33, a certificate-update requesting unit 34, and a certificate storage unit 35.

The HTTPS client-function unit 31 has a function of using a HTTPS protocol including authentication and encrypting processes according to the SSL to request communications with another apparatus, having a HTTPS server function, such as the low-level apparatus 20, etc., and transmitting to a communications counterparty a request (a command) and data so as to have an operation depending on the request and the data executed.

On the other hand, the HTTPS server-function unit 32 has a function of accepting a communications request using the HTTPS protocol from the other apparatus having the HTTPS client function, receiving from the other apparatus the request and the data so as to have each unit of the apparatus execute depending on the received request and data, and returning the executed outcome as a response to the requester.

The authentication processor 33 has a function of authentication means for performing authentication process using the digital certificate received from the communications counterparty when the HTTPS client-function unit 31 and the HTTPS server-function unit 32 authenticate the communications counterparty, and various certificates and private keys, etc., being stored in the certificate storage unit 35. Moreover, it has also a function of transmitting to the communications counterparty via the HTTPS client-function unit 31 and the HTTPS server-function unit 32 the digital certificate being stored in the certificate storage unit 35 for requesting authentication with the communications counterparty.

The certificate-update requesting unit 34 as described below has a function of transmitting an individual certificate to the communications counterparty of the low-level apparatus 20, etc., in predetermined cases so as to request that the transmitted certificate be stored. It is noted that information needed for a certificate-managing apparatus (CA) external to the communications system is transmitted so as to have the certificate transmitted herein issued.

The certificate-storage unit 35 has a function of storing authentication information such as various certificates and private keys, etc., and making the information available for the authentication process in the authentication processor 33. Types of these various certificates and private keys, and their uses and methods of being generated are described in detail below.

On the other hand, in the low-level apparatus 20, a HTTPS client-function unit 41, a HTTPS server-function unit 42, an authentication processor 43, a request manager 44, a certificate-storage unit 45, a state reporter 46, a log reporter 47, a certificate setting unit 48, and a command receiver 49 are provided.

The HTTPS client-function unit 41 in the same manner as the HTTPS client-function unit 31 of the high-level apparatus 10 has a function of requesting communications with another apparatus, having the HTTPS server-function, such as the high-level apparatus 10, etc., using the HTTPS protocol, and having an operation depending on the request and the data transmitted executed.

The HTTPS server-function unit 42 also in the same manner as the HTTPS server-function unit 32 of the high-level apparatus 10 has a function of accepting a communications request from another apparatus having a HTTPS client function, having each unit of the apparatus execute an operation depending on the received request and data, and returning a response to the requester.

The function of the authentication processor 43 is also the same as that of the authentication processor 33 of the high-level apparatus 10, while the certificate, etc., for use in the authentication process is one being stored in the certificate storage section 45.

The request manager 44 has a function of determining, for a request received from a high-level apparatus, whether to execute an operation based on the request. Then, it also has a function of passing on an operating request to the functional units 46 through 49 for executing an operation based on the request, when allowing the execution.

FIG. 4 illustrates the determining criteria on whether to execute as described above, the determining criteria being the types of requests and the types of digital certificates used in the authentication process in the authentication processor 43. As described in detail below, the digital certificate being stored in the high-level apparatus 10 and the low-level apparatus 20 may be one of an individual public-key certificate that is an individual certificate and that is a public-key certificate being provided with information identifying the apparatus (the own apparatus), and a common public-key certificate that is a common certificate and a public-key certificate not being provided with information identifying the apparatus, such that the request manager 44, as illustrated in FIG. 3, allows all operations when having performed an authentication process with the individual certificate, while it allows only an operation of setting a certificate when having performed an authentication process with the common certificate. Thus, the common certificate is a certificate for use only when having a new individual certificate to be stored in the low-level apparatus 20.

The certificate storage unit 45 in the same manner as the certificate storage section 35 of the high-level apparatus has a function of certificate-storing means for storing authentication information such as various certificates and private keys, etc., and making the stored information available to the authentication process in the authentication processor 33. It is noted that the certificates, etc., being stored are different from those in the authentication manager 33 as described below.

The state reporter 46 has a function of performing a call for reporting the state of the low-level apparatus 20 to the high-level apparatus 10 when an error is detected or when there is a user instruction. The report may be transmitted as a response to an inquiry from the high-level apparatus 10 or communications may be requested from the HTTPS client-function unit 41 to the high-level apparatus 10 so as to transmit the report.

The log reporter 47 has a function of reporting a log from the low-level apparatus 20 to the high-level apparatus 10. The contents of the reporting may be an operations log of the low-level apparatus 20, as well as for example, the counted value in a image-forming sheet counter for an image-forming apparatus, and for a measuring system, the measured value, etc. As the reporting is not required urgently, it may be transmitted as a response to an inquiry from the high-level apparatus 10.

The certificate-setting unit 48 has a function of individual certificate setting means for setting and updating the certificate, etc., being stored in the certificate storage unit 45 with an individual public-key certificate as described below received from the high-level apparatus 10.

The command receiver 49 has a function of executing an operation corresponding to a request related to a function other than the functions of each of the functional units 46 through 48 as described above. The operation includes, for example, transmitting data being stored in the low-level apparatus 20, and controlling an operation of an engine unit as needed. It is noted that the state reporter 46 and the log reporter 47 are illustrated as specific examples of functions being provided by the command receiver 49, so that providing such functions is not mandatory.

Figure 5:
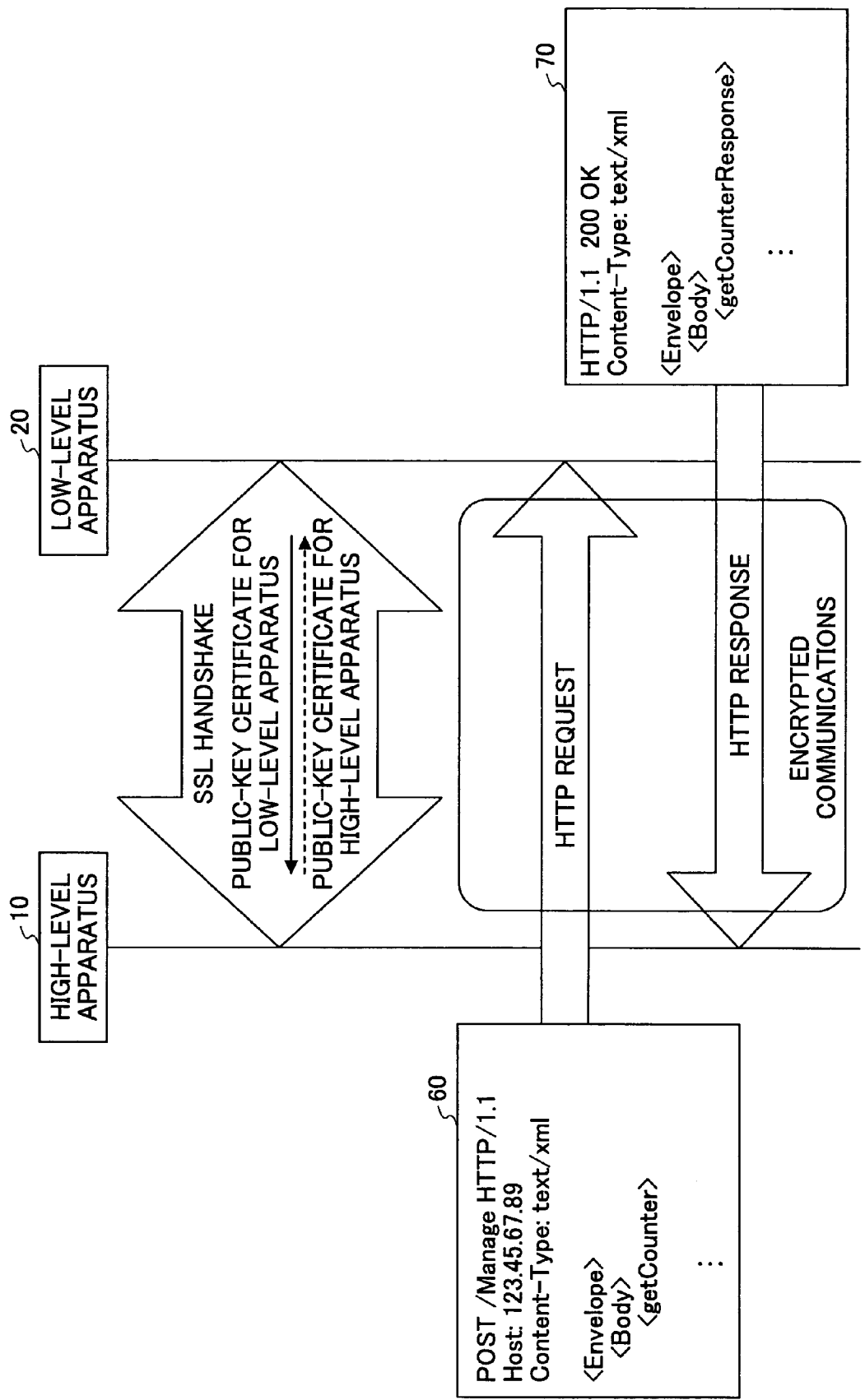
FIG. 5 is a schematic diagram for describing an overview of a method of communicating between the high-level apparatus and the low-level apparatus in the communications system as illustrated in FIG. 1.

Next, a method of communicating between the high-level apparatus 10 and the low-level apparatus 20 in the communications system is described. FIG. 5 is a diagram for describing an overview of the method of the communicating.

Figure 18:
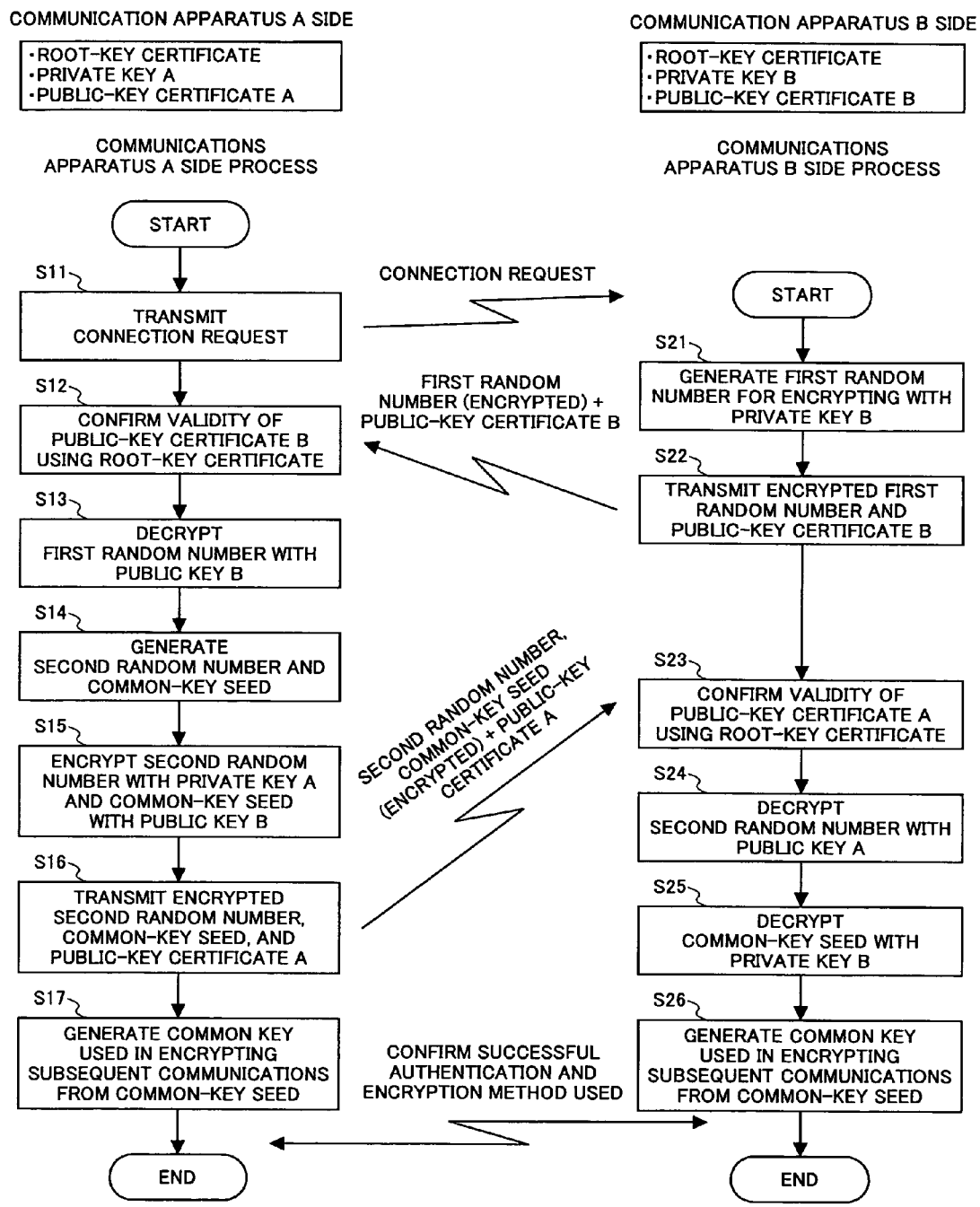
FIG. 18 is a diagram illustrating a flowchart of a process for executing in each apparatus when two communications apparatuses perform a mutual authentication according to the SSL, together with information for use in the process.
Figure 19A:
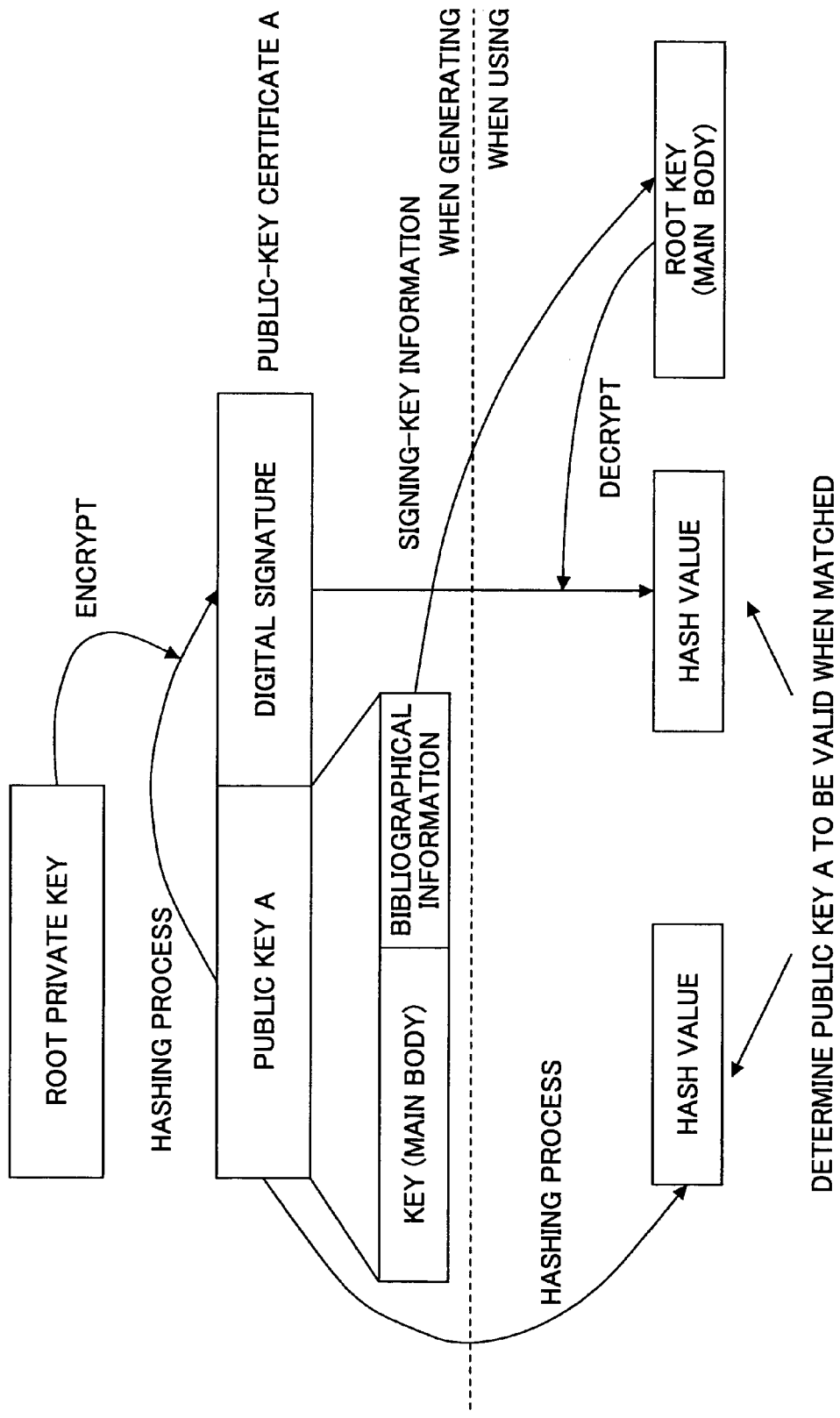
FIG. 19A is a diagram for describing a relationship among a root key, a private root-key, and a public-key certificate in the authentication process illustrated in FIG. 18.
Figure 20:
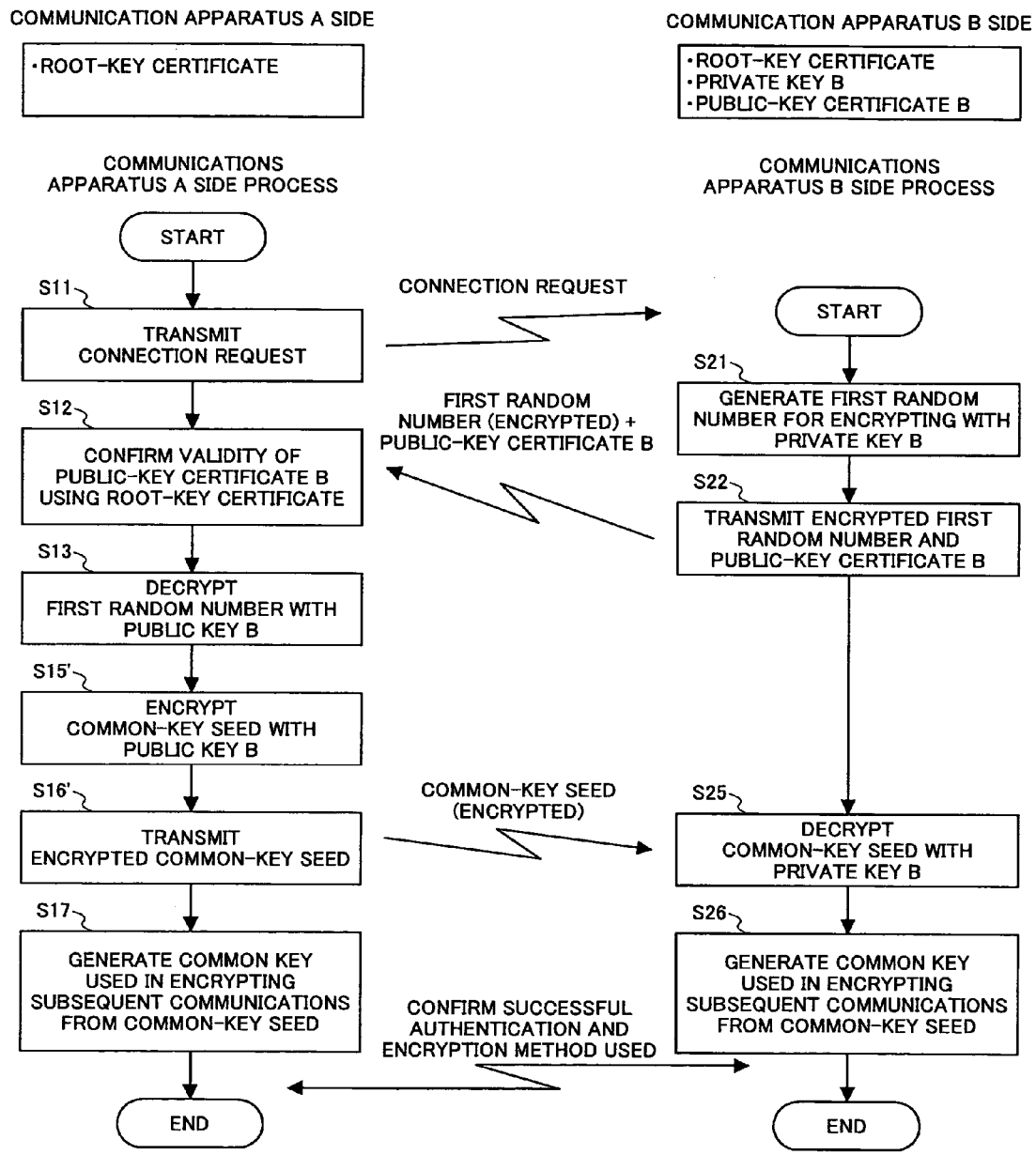
FIG. 20 is a diagram corresponding to FIG. 18, illustrating a process for executing in each apparatus when two apparatuses perform a one-way authentication according to the SSL.

In the communications system, the high-level apparatus 10, when trying to communicate with the low-level apparatus 20, first requests communications with the low-level apparatus 20. Then, when having authenticated the low-level apparatus 20 as a valid communications counterparty with an authentication process according to the SSL protocol such as described above using FIG. 18 or FIG. 20, the communications are established with the low-level apparatus 20. This authentication process is known as a SSL handshake. It is noted that a mutual authentication as illustrated in FIG. 18 is not mandatory so that a one-way authentication such as illustrated in FIG. 20 may be used.

In this process, as a first step the low-level apparatus 20 transmits own public-key certificate to the high-level apparatus 10, so as to receive authentication. Then, when performing mutual authentication, as a second step the high-level apparatus 10 also transmits to the low-level apparatus 20 its own public-key certificate so as to receive authentication, while for one-way authentication the second step is not performed.

Once the authentication as described above succeeds, the high-level apparatus 10 generates a request, that is a process command for an application-program method being implemented in the low-level apparatus 20, as a SOAP message 60 being written in a XML format that is a structured-language format and transmits the request according to the HTTP (Hyper Text Transfer Protocol) as a HTTP request to the low-level apparatus 20. Such a request is called a RPC (Remote Procedure Call).

Then, the low-level apparatus 20 executes a process according to the contents of this request, generates the executed outcome as a response SOAP message 70, and transmits the message as a HTTP response to the high-level apparatus 10. Herein, these requests and responses are encrypted using a common key shared in the SSL-handshake process, maintaining security of the communications.

Moreover, with these requests and responses, the communications system functions as a client-server system with the high-level apparatus 10 as a client and the low-level apparatus 20 as a server. It is noted that there may be a case in reverse such that the low-level apparatus 20 requests communications with the high-level apparatus 10, functioning as a client-server system with the low-level apparatus 20 as a client and the high-level apparatus 10 as a server.

Furthermore, for implementing the RPC, the technologies as described above as well as known protocols (communications standards), technologies and specifications such as FTP (File Transfer Protocol), COM (Component Object Model), and CORBA (Common Object Request Broker Architecture) may be used.

Figure 6A:
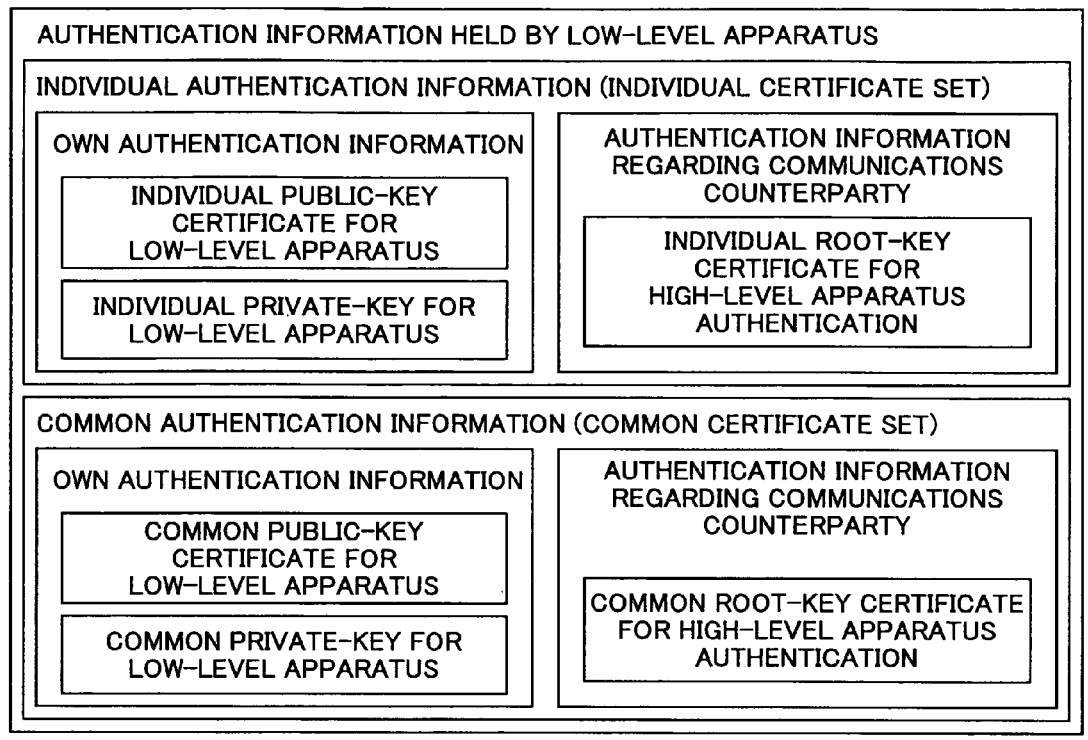
FIG. 6A is a diagram for describing authentication information which is stored by the low-level apparatus as illustrated in FIG. 1.
Figure 6B:
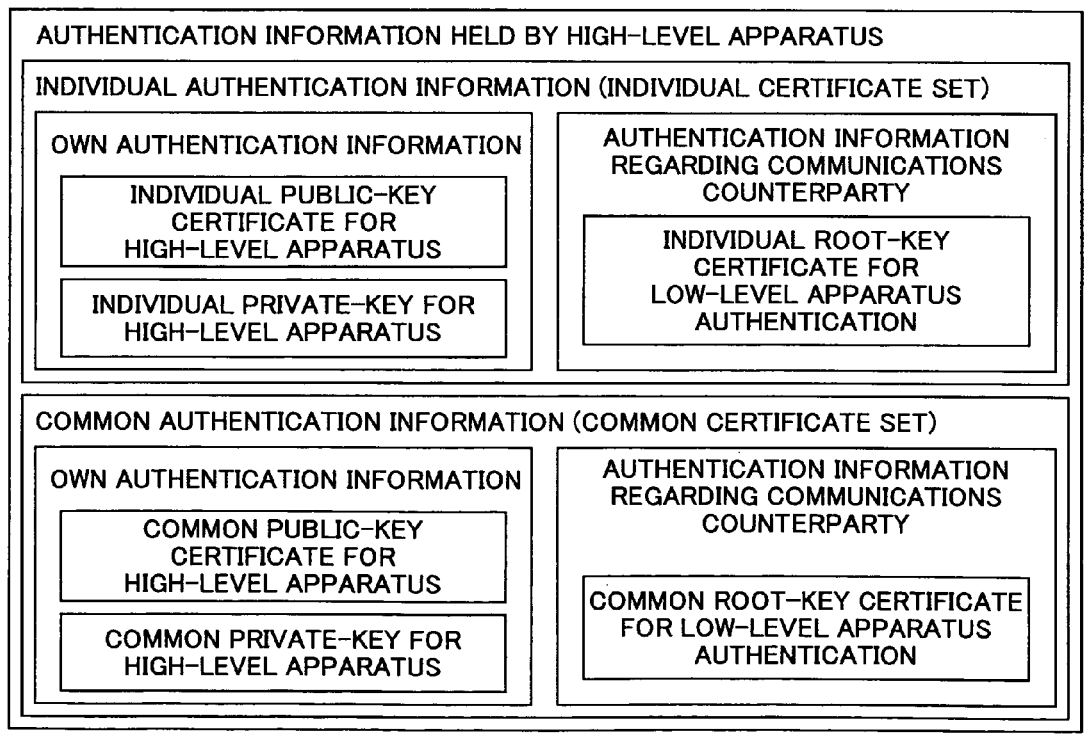
FIG. 6B is a diagram for describing authentication information which is stored by the high-level apparatus as illustrated in FIG. 1.

Next, characteristics and uses of certificates and keys that are authentication information for use by the high-level apparatus 10 and the low-level apparatus 20 in the authentication process as described above are described. FIG. 6A is a diagram illustrating the types of certificates and keys being stored as the authentication information by the low-level apparatus 20 and FIG. 6B is a diagram illustrating the types of certificates and keys being stored as the authentication information by the high-level apparatus 10.

The high-level apparatus 10 and the low-level apparatus 20 as illustrated in FIG. 6, store information largely classified into individual authentication information and common authentication information. Then for each apparatus, each of the individual and common authentication information is respectively configured with a public-key certificate and a private key that are own-authentication information, and with a root-key certificate that is authentication information regarding the communications counterparty.

Moreover, for example, the individual public-key certificate for the low-level apparatus is an individual certificate and is a digital certificate that is an individual public key issued to the low-level apparatus 20 by a Certificate Authority (CA) (not shown) having been provided with a digital signature enabled to confirm the validity using the individual root-key for the low-level apparatus authentication.

Figure 7:
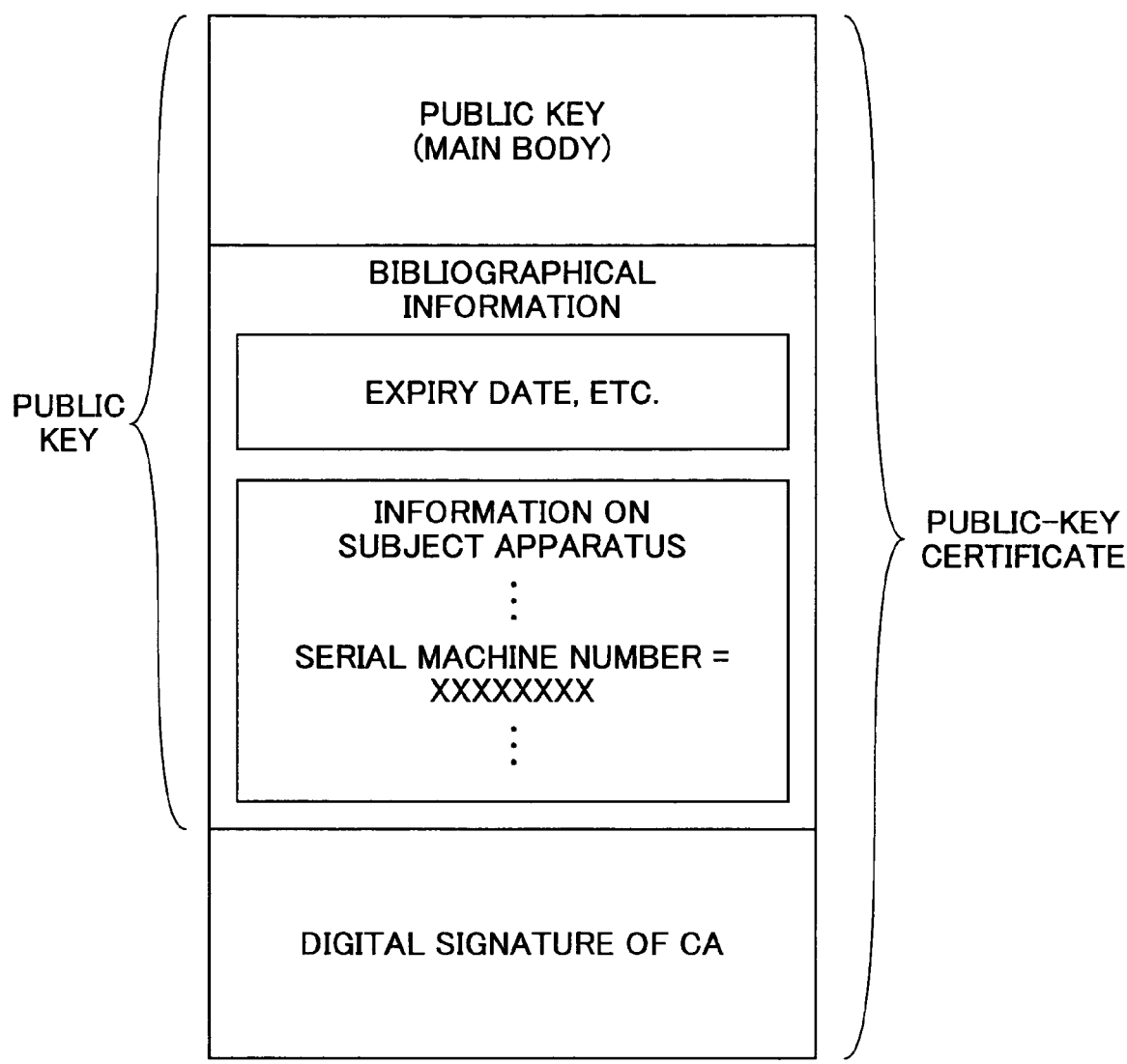
FIG. 7 is a diagram illustrating an example of information included in an individual public-key certificate for a low-level apparatus as illustrated in FIG. 6.

FIG. 7 illustrates an example of information included in an individual public-key certificate for a low-level apparatus, wherein the certificate includes, in bibliographical information, machine serial number information of the low-level apparatus 20 as information identifying the low-level apparatus 20 that is a subject of issuance. Furthermore, information on machine type number and registered user, etc., of the low-level apparatus 20 may be included.

It is noted that while including machine serial number information in the identifying information provided in the public-key certificate is not mandatory, herein the same information as the machine serial number information is included in the identifying information so as to respond to a demand when operating a communications system. In other words, when the communications system is used for managing the apparatus, a specifying of the apparatus is often performed with machine serial number information, while when the identifying information does not include the machine serial number information, a need arises such that a corresponding relationship between identifying information and machine serial number information is separately managed as a table, etc., at the high-level apparatus 10 side. Then, when performing such managing, a need arises to add data to every newly produced low-level apparatus 20; since the number of the low-level apparatuses 20 may become several tens of thousands, several hundreds of thousands or even more, a need arises to manage a very large amount of data, causing a great management burden.

However, having to include in the identifying information provided to the public-key certificate the same information as the machine serial number information enables directly specifying the machine serial number of the counterparty in a authentication process. Thus, in this way, there is no longer a need to manage the corresponding relationship between identifying information provided to a public-key certificate and machine serial number, thereby reducing the managing burden.

Moreover, returning to the description of FIG. 6, the individual private-key for the low-level apparatus is a private key corresponding to the individual public-key, while the individual root-key certificate for the high-level apparatus is a digital certificate having provided an individual root-key for the high-level apparatus with a digital signature enabled to confirm own validity using a private root-key corresponding to the individual root-key. Even when multiple low-level apparatuses 20 are provided, the individual public-key of each apparatus uses the same private root-key to provide the digital signature, so that the individual root-key certificates needed for confirming validity are made to be common. However, the individual public-key included in the individual public-key certificate and its corresponding private key differ from apparatus to apparatus. Herein, these individual public-key certificate, individual private-key and individual root-key certificate are collectively called an individual-certificate set.

The individual public-key certificate for the high-level apparatus, the individual private-key for the high-level apparatus, and the individual root-key certificate for the high-level apparatus authentication also have a relationship similar to the relationship as described above.

Then, for example, when the high-level apparatus 10 and the low-level apparatus 20 use individual-authentication information to perform mutual authentication, in response to a communications request from the high-level apparatus 10, the low-level apparatus 20 transmits to the high-level apparatus 10 a first random number encrypted using the individual private-key for the low-level apparatus together with the individual public-key certificate for the low-level apparatus. At the high-level apparatus 10 side, using the individual root-key certificate for the low-level apparatus authentication, first the validity (not having been damaged or manipulated) of the individual public-key certificate for the low-level apparatus is confirmed, and when this is confirmed the first random number is decrypted with the public key included therein. When this decrypting is successful, the high-level apparatus 10 can recognize that the low-level apparatus 20 of the communications counterparty is surely a subject of the individual public-key certificate for the low-level apparatus, enabling specifying the apparatus from identifying information included in the certificate. Then, depending on whether the specified apparatus is suitable as a communications counterparty by determining success or failure of authentication is enabled.

Then, at the low-level apparatus 20 side, a similar authentication may be performed using an individual public-key certificate for the high-level apparatus being transmitted when authentication succeeds at the high-level apparatus 10 side, and a root-key certificate for the high-level apparatus authentication, having stored a received random number having been encrypted with an individual private-key for the high-level apparatus.

Now, these public-key certificate and private key are to be stored in non-volatile storage means, enabled for rewriting, such as a flash memory configuring the ROM 22 or the RAM 23. Thus, as described above, when replacing a component including such storage means, the public-key certificate and private key being stored end up being dropped together with the old component having been fetched. Then in such a case, in order to enable authentication again using an individual public-key certificate, there is a need to have the fetched certificate and key stored again.

Herein, assuming that each apparatus can only perform authentication using an individual public-key certificate, in a state such that this authentication cannot be performed, there is no method of transmitting a new individual public-key certificate, etc., to a subject apparatus securely via the network 30. However, each apparatus configuring the communications system of the embodiment has common authentication information stored in order to deal with such a situation, so that using the stored information enables securely transmitting to a desired apparatus a new individual public-key certificate, etc., via the network 30.

The common authentication information generally has the same configuration as the individual authentication information. For example, the common public-key certificate for the low-level apparatus is a common certificate, and is a digital certificate that contains a common public-key issued by the CA to the low-level apparatus having been provided with a digital signature enabled to confirm the validity using a common root-key for the high-level apparatus, while the common private-key for the high-level apparatus is a private key corresponding to the common public-key, and the common root-key certificate for the low-level apparatus authentication is a digital certificate that contains the common root-key for the low-level apparatus having been provided with a digital signature enabled to confirm the validity using the own one. Then, the common public-key certificate and common private-key and common root-key certificate are to be collectively called a common certificate set. The same holds for the common authentication information to be stored at the high-level apparatus side 10.

However, the point that differs largely from individual authentication information is that, in the bibliographical information of the common public-key certificate, information identifying the apparatus is not included, enabling the same common public-key certificate to be stored in apparatuses of the same level (In an example illustrated in FIGS. 1 and 17, the levels of the high-level apparatus and the low-level apparatus are to exist). In this case, there is no need to distinguish individually apparatuses of the same level, having entirely common ones for all, including the common public-key included in certificates and its corresponding common private-key. Then, as the common public-key certificates of the communications counterparties are identical, the root-key certificates become common for all apparatuses to be the communications counterparties for an apparatus of a certain level. In other words, even when providing multiple low-level apparatuses 20, the same common authentication information is stored in all low-level apparatuses 20.

This is also the same for the common authentication information of the high-level apparatus 10.

It is noted that, when standardizing the data format with the individual public-key certificate, providing "0" as the serial machine number in a format as illustrated in FIG. 7 so as to indicate it as a common public-key certificate, etc., is also possible.

Such common authentication information may be stored uniformly as an information item corresponding to a level determined depending on the machine type of the apparatus in which the component is to be installed, at the time of manufacturing a component provided with a storage area for a certificate, in view of a characteristic that the common authentication information may be set to be common for all the apparatuses of the same level. Then such common authentication information stored in advance in a component enables being able to authenticate using a common public-key certificate included in the common authentication information stored in a new component, even when a component is replaced so that there is no longer any individual authentication information within the apparatus. Moreover, for a component having stored such common authentication information and not having stored individual authentication information, as apparatus identifying information is not needed at the time of manufacturing, producing a component able to use commonly without depending on the apparatus identifying information is enabled. Thus, having a component in stock enables a rapid response when there arises a need for replacing.

Herein, as the common public-key certificate is not provided with apparatus identifying information, performing authentication using a common public-key certificate specifically identifying the apparatus of the communications counterparty is not possible. However, it is possible to obtain information on the communications counterparty to a certain extent.

In other words, for example, a certain vendor has stored common certificate sets for the low-level apparatus in all apparatuses applicable as a low-level apparatus 20 out of own products and has stored common certificate sets for the high-level apparatus in all apparatuses applicable as a high-level apparatus 10 to be the communications counterparty. When the authentication is successful, the low-level apparatus 20 is enabled to recognize that a counterparty having transmitted a public-key certificate enabled to confirm the validity with a common root-key certificate for the high-level apparatus authentication being stored in the own one is the high-level apparatus 10 of the same vendor. Conversely, the high-level apparatus 10 is also enabled to recognize that a counterparty having transmitted a public-key certificate enabled to confirm the validity with a common root-key certificate for the low-level apparatus authentication being stored in the own one is the low-level apparatus 20 of the same vendor.

Thus, determining to a certain extent whether an apparatus requesting or having requested communications is a suitable apparatus as a communications counterparty is enabled even when identifying information cannot be referred to.

Then, when such authentication succeeds, as described above, establishing with the communications counterparty a secure communications route using common-key encryption by having shared a common key is enabled, also making possible specifying the communications counterparty by subsequently exchanging machine serial number information.

It is to be noted that, in the authentication information as illustrated in FIG. 6, the same individual root-key certificate may be used regardless of the subject of the authentication (for example, the individual root-key certificate for the high-level apparatus authentication and the individual root-key certificate for the low-level apparatus authentication may be the same one). This is because as the individual public-key certificate is provided with apparatus-identifying information, when the validity can be confirmed using the root-key certificate, it is possible thereafter to refer to the identifying information so as to specify the machine type and the level of the apparatus. On the other hand, as the common certificate is not provided with the apparatus-identifying information, the distinguishing of the type is performed according to whether the validity can be confirmed with a specific root-key certificate. Therefore, the common root-key certificate may be set to be different per group of authentication subjects to be distinguished.

Now, the low-level apparatus 20 functioning as a server, for a SSL handshake, cannot identify counterparties having requested communications, so that basically the same public-key certificates are transmitted to all counterparties. However, in this communications system, making proper use of the individual public-key certificate and the common public-key depending on the situation is needed. Thus, next a configuration for making such proper use is described using FIG. 8.

In the SSL protocol, as it is not possible at the time of a communications request from a client for a server to know the state of the client, inevitably when a specific URL (Uniform Resource Locator) is accessed the same public-key certificate is always provided. Thus basically, it is not possible to assume a configuration such as having multiple individual public-key certificates, nor to select an appropriate one according to the type of the individual root-key certificate that the communications counterparty has. However, when addresses accpeting the communications request differ, it is possible to return a different public-key certificate per address. This address may be determined for example with the URL.

Figure 8:
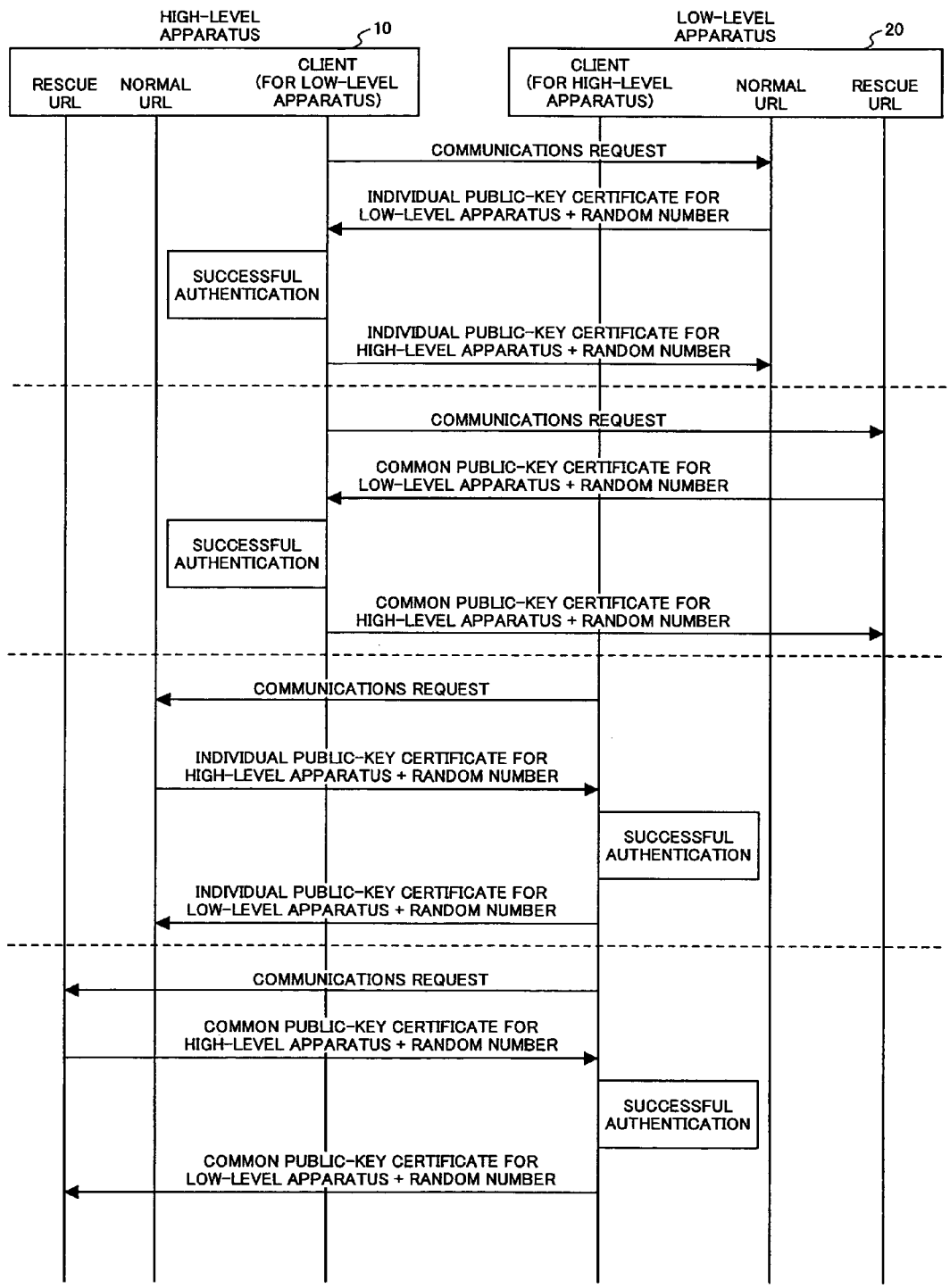
FIG. 8 is a sequence diagram for describing a configuration for the high-level apparatus and the low-level apparatus as illustrated in FIG. 1 making proper use of the individual public-key certificate and a common public-key certificate.

Thus herein, as illustrated in FIG. 8, the high-level apparatus 10 and the low-level apparatus 20 are respectively provided with a normal URL for performing authentication with an individual public-key certificate and a rescue URL for performing authentication with a common public-key certificate, so that the side requesting the communications (the side functioning as the client) selectively designates either of the URLs depending on the type of the desired authentication so as to send a communications request. The URLs changing an IP address or a port number (either one suffices) enables handling as URLs of logically different apparatuses, even for URLs of physically the same apparatus. In other words, this is for implementing a function of a so-called virtual server.

In such a case, the side being requested to communicate (the side functioning as the server) being enabled to distinguish between the certificates to be returned with the URL having accepted the communications request, returns the individual public-key certificate when accepted at the normal URL, and returns the common public-key certificate when accepted at the rescue URL.

It is noted that, at the client side requesting the communications, where the URL to which the communications request is sent is known, performing mutual authentication selecting an appropriate public-key certificate depending on the URL so as to be transmitted is enabled.

Thus, in this communications system, while basically performing authentication using an individual public-key certificate between the high-level apparatus 10 and the low-level apparatus 20, even when the certificate has been dropped due to replacing a component, performing authentication using a common public-key certificate after a new component is installed and maintaining a secure communications route are enabled. This is because sharing the common key is possible in the same manner as the individual public-key certificate, even for authentication using the common public-key certificate. Then, using the communications route to transmit from the high-level apparatus 10 to the low-level apparatus 20 individual authentication information for setting so as to be stored, enables recovering again the state of being able to authenticate using individual authentication information.

Moreover, even for authentication using a common public-key certificate, as described above it is possible to specify the apparatus of the counterparty to some extent, putting a limit such as, for example, transmitting the individual certificate only to apparatuses manufactured inhouse, making it possible to prevent transmitting an individual certificate to an invalid apparatus.

As described above, in this communications system, by using common authentication information in addition to individual authentication information, even when a need arises to replace a component storing a certificate necessary for authentication, recovering to the state of being able to perform a successful authentication easily and speedily is enabled.

It is noted that while all of the authentication information items illustrated in FIG. 6 need to be stored when the high-level apparatus 10 and the low-level apparatus 20 perform mutual authentication, some of the certificates, etc., need not be stored when only one-way authentication such as when the low-level apparatus 20 functions as a server and the high-level apparatus 10 authenticates the low-level apparatus 20 is performed. For both individual authentication information and common authentication information, in the low-level apparatus 20, the root-key certificate for the high-level apparatus is not needed and, in the high-level apparatus 10, the public-key certificate for the high-level apparatus and the private key for the high-level apparatus are not needed.

Next, hardware being provided with a storage area for storing the authentication information as described above, in the low-level apparatus 20 and the high-level apparatus 10, is described.

In the low-level apparatus 20 and the high-level apparatus 10, from a design point of view, such storage area may be provided anywhere as long as the storage area is in a non-volatile recording medium (it is noted that preferably an area for storing an individual-certificate set is provided in a rewritable recording medium). For example, in the low-level apparatus 20, a recording area for recording an individual-certificate set may be provided in the RAM 23, and a recording area for recording a common-certificate set may be provided in the ROM 22.

Figure 9A:
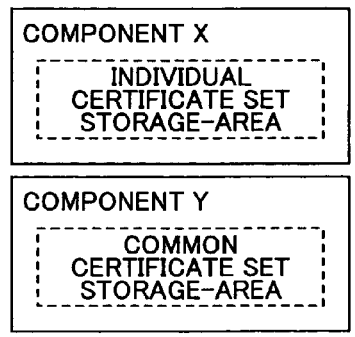
FIG. 9A is a diagram for describing a configuration of replacement components providing storage areas for certificates and its problem, in a comparative example of the embodiment as illustrated in FIG. 1, etc.
Figure 9B:
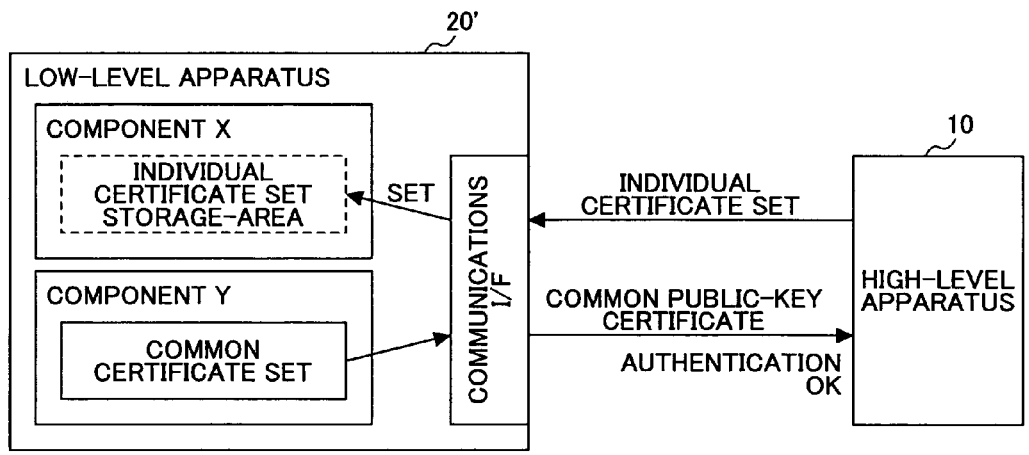
FIG. 9B is another diagram for describing the configuration of the replacement components providing the storage areas for the certificates and its problem, in another comparative example of the embodiment as illustrated in FIG. 1, etc.
Figure 9C:
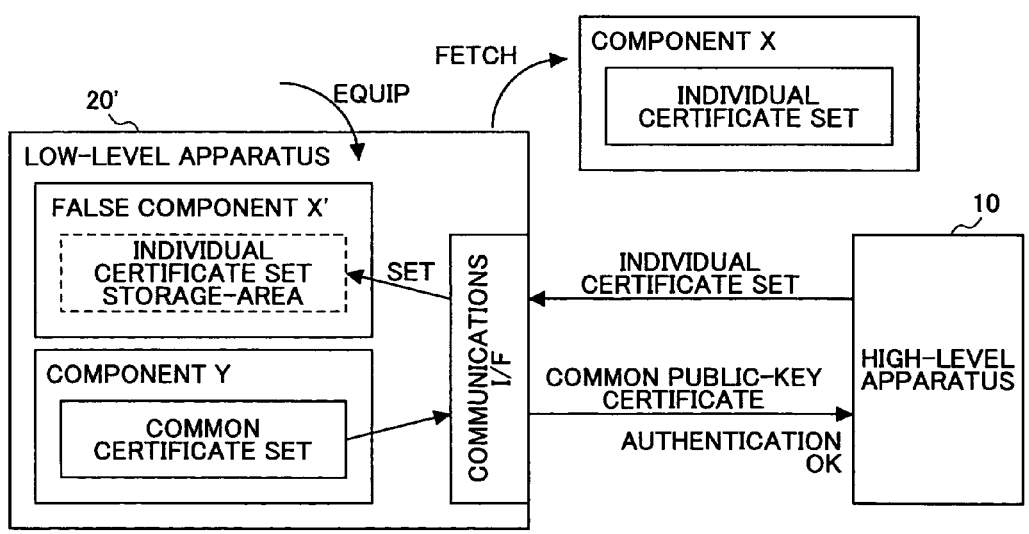
FIG. 9C is yet another diagram for describing the configuration of the replacement components providing the storage areas for the certificates and its problem, in yet another comparative example of the embodiment as illustrated in FIG. 1, etc.

However, when a storage area for an individual-certificate set and a storage area for a common-certificate set are respectively provided in components that may be replaced separately, the following problem may arise. The problem is described using FIGS. 9A through 9C. FIGS. 9A through 9C are diagrams for describing, in comparative examples of the embodiment, configurations of replacement components providing storage areas for certificates and their problems.

As a comparative example, as illustrated in FIG. 9A, a configuration is considered such that a component X and a component Y that may be replaced separately are respectively provided with an individual-certificate set storage-area and a common-certificate set storage-area. Then, in this case, for the component X, as at the time of manufacturing normally the machine serial number of a subject apparatus for installing is not known, an individual certificate cannot be made ready so that the manufacturing is done at the state of not having stored the individual certificate set. On the other hand, for the component Y, the machine type and the level of the subject apparatus for the installing can be specified at the time of manufacturing, enabling manufacturing at the state of having stored in advance a common-certificate set suitable for the machine type and the level.

Then, when in a low-level apparatus 20' a component X and a component Y are damaged, etc., so that these are replaced (the same holds when only the component X is replaced), as illustrated in FIG. 9B, in the low-level apparatus 20', the state is such that only a common-certificate set is stored and an individual-certificate set is not stored. In this state, when the high-level apparatus 10 authenticates the low-level apparatus 20" with an authentication process using a common public-key certificate for the low-level apparatus included in the common-certificate set, the individual-certificate set is transmitted to the low-level apparatus 20' for having to set into the individual-certificate set storage-area. Thereafter authenticating using an individual public-key certificate for the low-level apparatus included in the individual-certificate set is enabled.

However, as illustrated in FIG. 9C, when subsequently removing a component X from the low-level apparatus so as to install a false component X' having a storage area similar to the component X, in the same manner as in FIG. 9B, with only a common-certificate set being stored in a low-level apparatus 20', the high-level apparatus 10 again transmits an individual-certificate set to the low-level apparatus 20 so as to have the set stored. Then, the component itself providing a storage area for a certificate is often a component that has a high degree of general use, such as a memory card, etc., so that often it is easy to obtain a false component X' enabled to provide a storage area similar to one in a normal component X. Thus, repeated replacing using false components may cause a problem such that the user obtains a large number of false components X', having stored normal individual-certificate sets, which may possibly be abused for disguising, etc. It is noted that as long as a normal one is used for a component Y, a problem similar to one as described above may arise even when no normal components X are used at all.

Figure 10A:
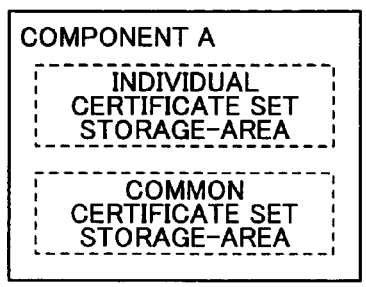
FIG. 10A is a diagram for describing a configuration of a replacement component providing storage areas for certificates and its advantages, in the low-level apparatus as described in FIG. 1.
Figure 10B:
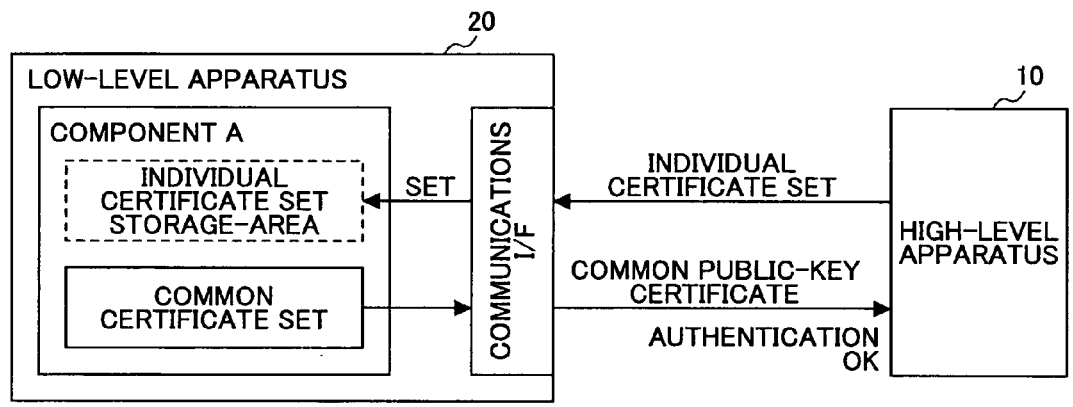
FIG. 10B is another diagram for describing the configuration of the replacement component providing the storage areas for the certificates and its advantages, in the low-level apparatus as described in FIG. 1.
Figure 10C:
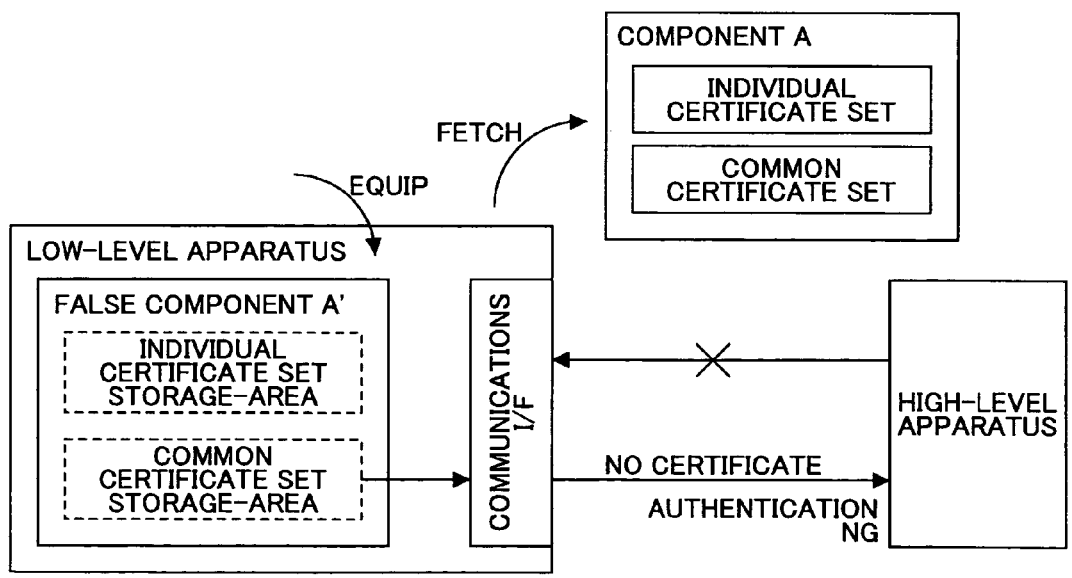
FIG. 10C is yet another diagram for describing the configuration of the replacement component providing the storage areas for the certificates and its advantages, in the low-level apparatus as described in FIG. 1.

Next, configurations of the embodiment and the advantages are described using FIGS. 10A through 10C. FIGS. 10A through 10C are diagrams for describing configurations of replacement components providing storage areas for certificates and the advantages, in the low-level apparatus 20.

In the low-level apparatus 20 of the embodiment, in order to resolve the problems as described above, as illustrated in FIG. 10A, in a manner different from the configuration of the comparative example as illustrated in FIG. 9A, both a storage area for storing an individual-certificate set and a storage area for storing a common-certificate set are provided on a replacement component as a minimum unit enabled for replacing. However, even when assuming such a configuration, the characteristic of a certificate does not change so that in the same manner as in FIG. 9A, the component A is manufactured at the state of having stored in advance only the common-certificate set, and not having stored the individual-certificate set.

Herein, when in the low-level apparatus 20 a component A is damaged, etc., so that it is replaced, as illustrated in FIG. 10B, in the low-level apparatus 20, only the common-certificate set is stored and the individual-certificate set is not stored. Then, in the same manner as in FIG. 9B, when the high-level apparatus 10 authenticates the low-level apparatus 20 with an authentication process using a common public-key certificate for the low-level apparatus, the individual-certificate set is transmitted to the low-level apparatus 20 so as to be set, enabling authentication using the individual public-key certificate for the low-level apparatus.

However, thereafter as illustrated in FIG. 10C even when a component A is removed from the low-level apparatus so as to install a false component A' having the same storage area as the component A, the false component A' does not have stored a valid common-certificate set. This is because a vendor other than a valid vendor does not know a valid common-certificate set, making impossible the manufacturing of the false component A' having stored a valid common-certificate set. Thus, in a manner different from the case in FIG. 9C, the low-level apparatus 20 cannot receive authentication by the high-level apparatus 10, preventing the high-level apparatus 10 from transmitting to the low-level apparatus the individual-certificate set. Thus, even when configuring the component A with a component with a high degree of general use as hardware, preventing an individual-certificate set from being set invalidly in a false component A' is enabled.

When removing the component A so as to replace it with another normal component A, a new individual-certificate set would be stored therein. With a normal component A, it is possible for the vendor side to control distribution so that the components A are not supplied to the user in excess of the number of the components A needed.

In this communications system, adopting a configuration such as described above enables preventing the invalid obtaining of an individual certificate, and reducing the danger of disguising, etc., so as to maintain a high degree of security of communications.

It is noted that a replacement component as a minimum unit enabled for replacement herein denotes a component needing replacing of all of its portions, when replacing a component enabled for replacement, by means of a user task or an on-site maintenance task, etc., by a servicing representative. For example, a memory card or a memory unit provided with a flash memory or a NVRAM, etc., configuring the ROM 22 or the RAM 23, or a CPU board, etc., having mounted the CPU 21 as well as a rewritable non-volatile memory is possible. However, even though multiple memory chips are mounted on the CPU board and these are individually replaceable by using special facilities at a plant, etc., when it is normally not possible to replace them by means of a user task or an on-site maintenance task, etc., by the servicing representative, they would not be denoted as replaceable ones.

Next, a component A having been provided with a storage area for a certificate set as described above and a manufacturing process of the lower-level apparatus 20 having the component A installed are described.

Figure 11:
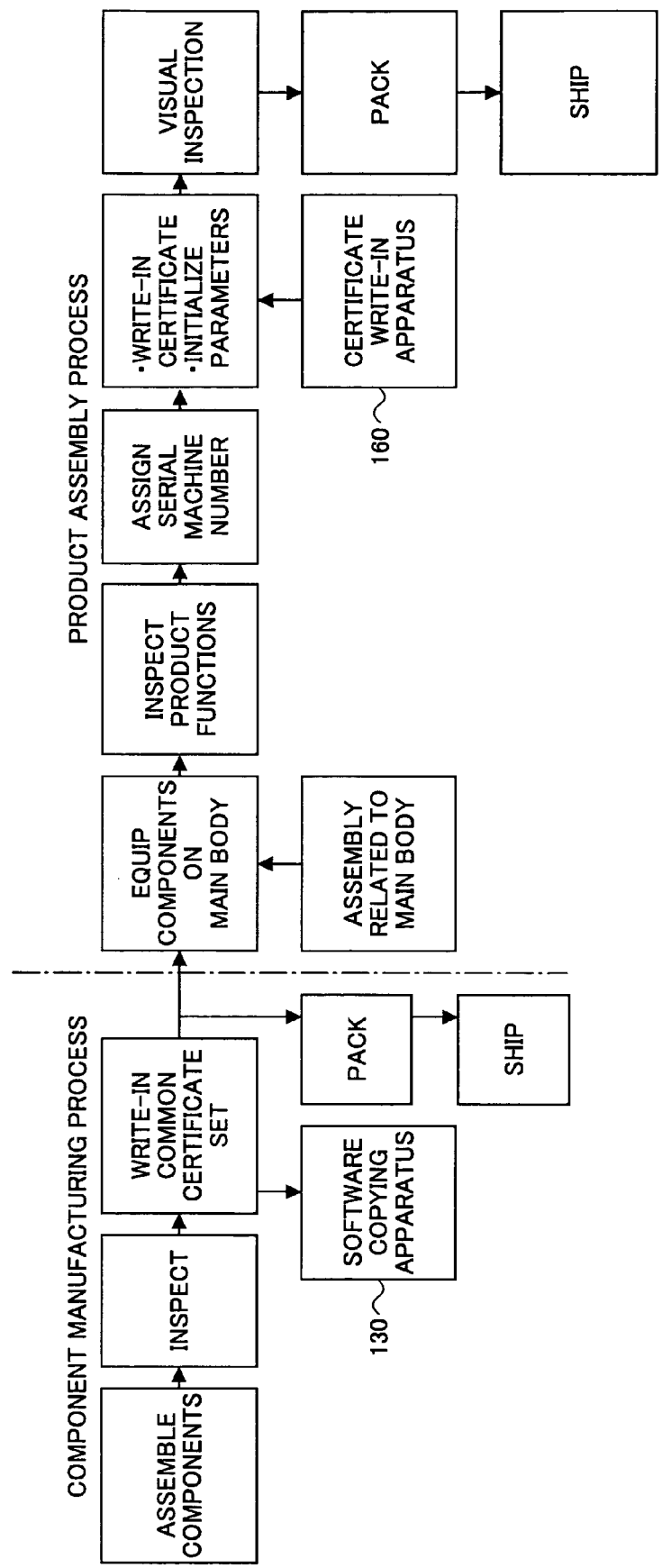
FIG. 11 is a diagram illustrating an overview of a component A as illustrated in FIG. 10 and a manufacturing process of the lower-level apparatus being equipped with the component A.

First, an overview of the manufacturing process is illustrated in FIG. 11. In FIG. 11, mainly a portion related to setting of a certificate set is illustrated, so that other portions are largely simplified for illustration.

As illustrated in FIG. 11, when manufacturing the low-level apparatus 20, first, in a component manufacturing step a component A having been provided with a storage area for a certificate set is manufactured. In the step as described above, the component A is assembled, inspected, and then by means of a plant software copying apparatus 130 a common-certificate set for the low-level apparatus 20 is written in. At this time, it is not possible to provide a secure communications route via a network between the software copying apparatus 130 and the component A. The impact of having leaked a common certificate set is greater than that of having leaked an individual certificate set, so that writing is performed directly using a dedicated jig. Moreover, at this time, software items for use in controlling the low-level apparatus 20 may be written in at the same time.

As described above, the component A is completed so that when having to be distributed as a component it is packed for shipping.

Herein, the common-certificate set is determined depending on the machine type and the level of an apparatus into which the component A is to be installed so that the set may be stored in advance in the software copying apparatus 130. Moreover, when the component A is a standardized memory card, etc., assembly may not be needed.

On the other hand, when using the component A for manufacturing the low-level apparatus 20, the component having written in a common-certificate set is passed on to a product-assembly step for installing in a main body of the low-level apparatus 20 in assembly. Then, after the assembly of the low-level apparatus 20 is completed, a functional test is performed and a machine serial number is assigned to an apparatus having passed the test. Then, an individual-certificate set having included the machine serial number as apparatus-identifying information in an individual public-key certificate is stored in the low-level apparatus 20 with a certificate write-in apparatus 160, and apparatus machine serial number information and initial set values are also stored in this step. Then, a visual inspection is performed, followed by packing and shipping.

With the steps as described above, the low-level apparatus 20 may be manufactured. Moreover, while the common-certificate set to be stored differs, manufacturing may be possible with the same steps also for the high-level apparatus 10. It is noted that often the component-manufacturing step and the product-assembly step are performed in different plants.

Figure 12:
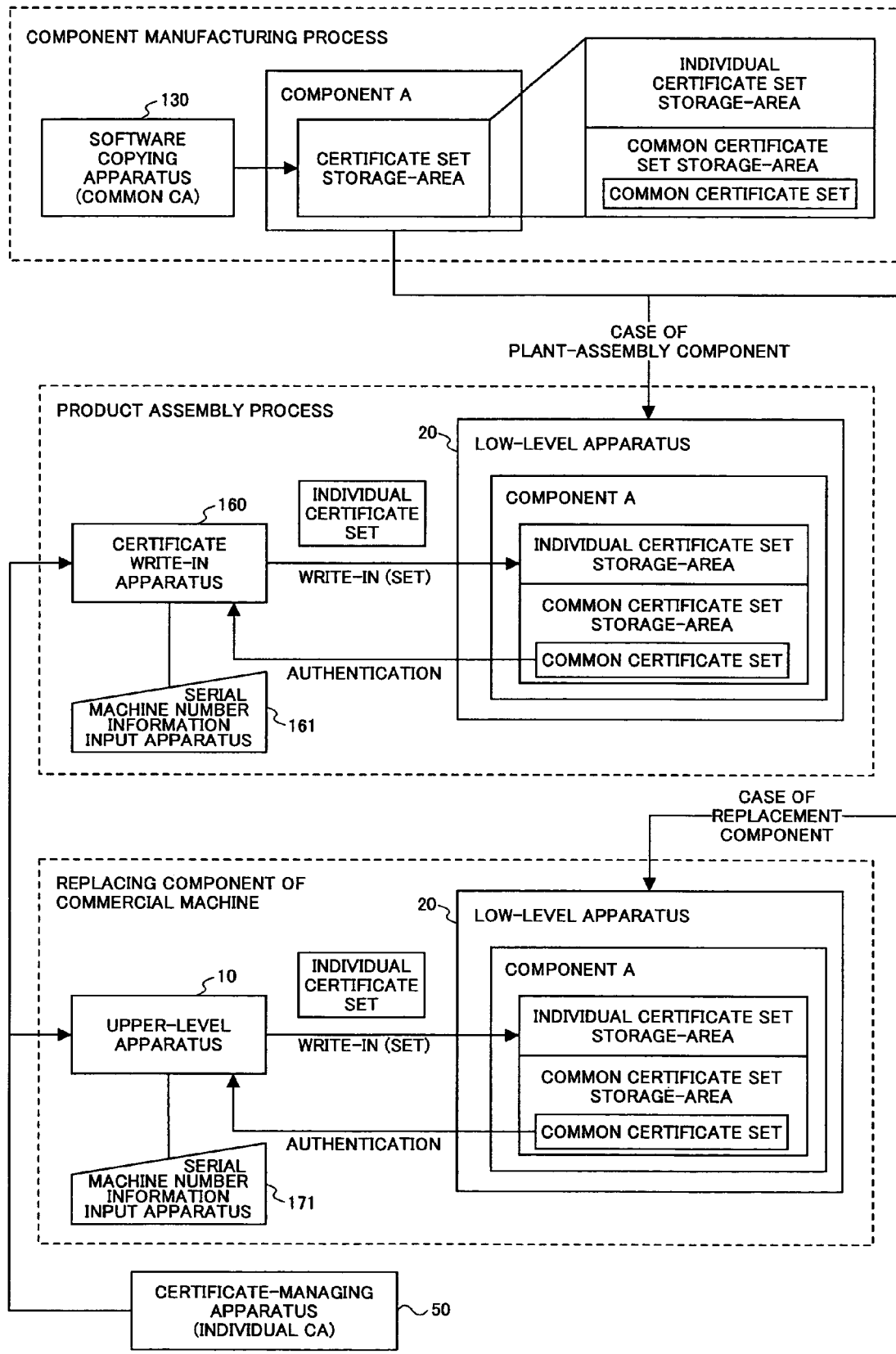
FIG. 12 is a diagram for describing steps of having each certificate set to be stored in the component A.

Moreover, in FIG. 12, a diagram for describing steps of having to store each certificate set in the component A is illustrated.

As illustrated in FIG. 12, in the component A in the component-manufacturing step only the common-certificate set is stored so that the individual-certificate set is not stored. Then in this state, in the product-assembly step, a component enabled to be used for either one of a component for use in assembly of a new apparatus and a replacement component (a servicing part) for a commercially-sold apparatus is completed.

Then, when the component A is installed in the apparatus in the product-assembly step in an apparatus-assembly plant, after the apparatus passes an inspection and is assigned a machine serial number, an individual-certificate set is written in with the certificate write-in apparatus 160. At this time, the machine serial number of a subject apparatus for write-in is input from a machine serial number information input apparatus 161 to the certificate write-in apparatus 160, and the certificate write-in apparatus 160 obtains an individual-certificate set having included the machine serial number information as identifying information for writing in. The individual-certificate set is one that is issued by the certificate-managing apparatus 50 that is a CA for managing the individual certificates.

It is to be noted that at this time once the certificate write-in apparatus 160 and the lower-level apparatus 20 are connected, a communications request is made from the certificate write-in apparatus 160 to a rescue URL of the low-level apparatus 20, and an authentication process is performed according to the SSL using a common-certificate set being stored in the low-level apparatus 20. Then, when the certificate write-in apparatus 160 authenticates that the low-level apparatus 20 is valid, a certificate-setting request together with an individual-certificate set is transmitted so as to be written in an individual-certificate set storage area of the component A.

Figure 13:
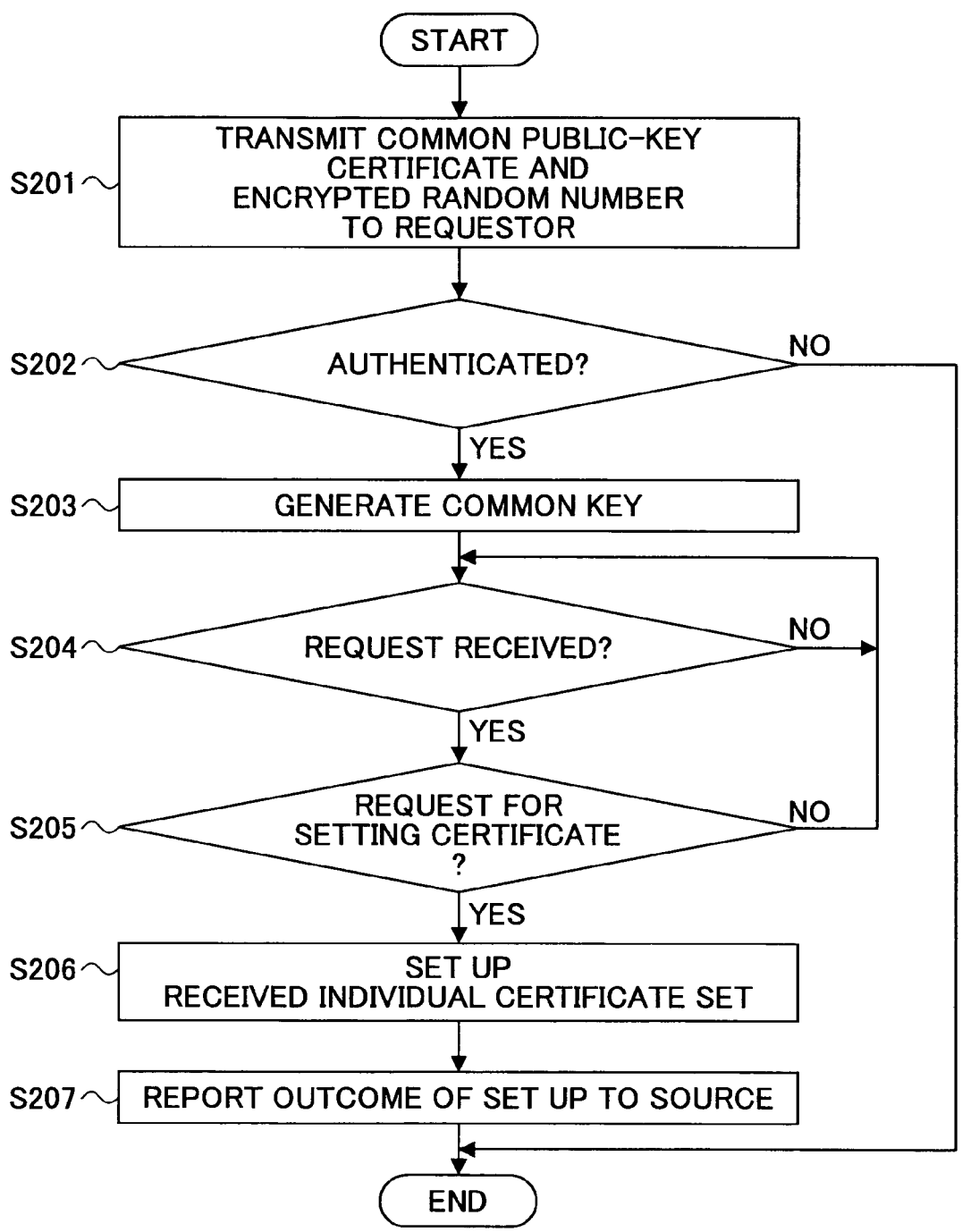
FIG. 13 is a flowchart illustrating a process of executing at the low-level apparatus side when writing an individual certificate set into the low-level apparatus in the steps as illustrated in FIG. 12.

Herein, a process of executing at the low-level apparatus 20 side when writing in an individual-certificate set is illustrated in a flowchart in FIG. 13.

When a communications counterparty of the low-level apparatus 20 has sent a communications request to a rescue URL, a process illustrated in the flowchart in FIG. 13 is started.

In this process, first in Step S201, in order to receive authentication by the communications counterparty (herein the certificate write-in apparatus 160) a common public-key certificate for the low-level apparatus together with a first random number encrypted with a common private-key for the low-level apparatus is transmitted. This process corresponds to the process of Steps S21 and S22 in FIG. 20.

The communications party once receiving the certificate and the random number transmitted by the low-level apparatus 20 performs an authentication process using the received information and returns the outcome of the authentication as a response. Moreover, when the authentication is successful, a common-key seed is transmitted to the low-level apparatus 20 and a common key is generated for use in subsequent communications. In the authentication herein a common root-key certificate for the low-level apparatus is used, this process corresponding to the process of Steps S12 through S17 in FIG. 20.

The low-level apparatus 20, once receiving this authentication outcome, determines in Step S202 whether the authentication is successful so that when not successful the process is terminated as it is, whereas when it is successful the process proceeds to Step S203 so that a common key is generated, using the common-key seed received, for use in subsequent communications. These processes correspond to the process in Steps S25 through S26 in FIG. 16.

Then, in Step S204 the process waits for receiving a request and once receiving the request the process proceeds to Step S205. Then, as described using FIG. 4, the request manager 44 of the low-level apparatus 20 only when having performed authentication using a common public-key certificate allows a certificate-setting operation, so that in Step S205 whether the request received is a certificate-setting request is determined. Then, when not the certificate-setting request, the request is ignored, returning to Step S204 for a waiting the next request. Herein, a response that a request cannot be accepted may be returned.

In Step S205, for a certificate-setting request, the process proceeds to Step S206 so that a certificate set received (obtained from the communications counterparty) together with the certificate-setting request is stored in an individual-certificate set storage area of the component A so as to set the individual-certificate set as illustrated in FIG. 6A with the stored contents. In this process, the CPU 21 of the low-level apparatus 20 functions as individual-certificate setting means.

Then, in Step S207 the set outcome is reported to the source as a response so as to terminate the process.

The low-level apparatus 20 executing such a process enables the certificate write-in apparatus 160 to perform at least a minimum level of confirming that the low-level apparatus 20 is a subject of writing in the individual-certificate set, enabling preventing of a situation such that an individual-certificate set is erroneously transmitted to an entirely different apparatus.

Moreover, a common-certificate set may also be stored at the certificate write-in apparatus 160 side so that a mutual authentication is performed with the low-level apparatus 20 in the authentication process. The common-certificate set used herein becomes the same as one stored in the high-level apparatus 10 so that the authentication process at the low-level apparatus 20 side also corresponds to the process as illustrated in FIG. 18. Then, in this way, even at the low-level apparatus 20 side, it is possible to make sure not to set an individual-certificate set having been sent from an invalid certificate write-in apparatus.

Then, for a communications request, it is possible that the communications request is made from the low-level apparatus 20 side to the certificate write-in apparatus 160. Even in this case, the certificate write-in apparatus 160 and the low-level apparatus 20 performing an authentication process using a common public-key certificate and, when it is successful, the certificate write-in apparatus 160 transmitting to the low-level apparatus 20 an individual certificate so as to be set, is the same as in the process as described above.

On the other hand, in FIG. 12 when the component A is shipped as a replacement component and is installed in a low-level apparatus 20 in operation at an installed site, the individual-certificate set is written in by the high-level apparatus 10 corresponding to the low-level apparatus 20. Then, a machine serial number of a subject apparatus of writing in is input from the machine serial number information input apparatus 171 to the high-level apparatus 10, the high-level apparatus 10 causes the certificate-managing apparatus 50 to issue an individual-certificate set having included the machine serial number information as identifying information, and obtains the issued set for having the low-level apparatus 20 to set. The identifying information, such as the machine serial number, of the low-level apparatus 20 may be transmitted from the low-level apparatus 20 to the high-level apparatus 10 depending on the request from the high-level apparatus 10.

It is noted that at this time a communications request is made from the high-level apparatus 10 to a rescue URL of the low-level apparatus 20, and an authentication process is performed according to the SSL, using a common-certificate set being stored in the low-level apparatus 20. Then, when the high-level apparatus 10 authenticates that the low-level apparatus 20 is a valid apparatus, an individual-certificate set is transmitted so as to be set in an individual-certificate set storage area of the component A. In this case, the process performed at the low-level apparatus 20 side is the same as one illustrated in FIG. 13. As a matter of course, it is possible to perform mutual authentication. While the advantages of what is described above are the same as a case of writing in with the certificate write-in apparatus 160, it can be said that the demand for improving the level of security is greater for a case after shipment wherein it is not known as to which apparatus a connection is made to, than for a case within a plant with limited subjects for the connection.

Moreover, enabling making a communications request from the low-level apparatus 20 to the high-level apparatus 10 is the same as in the case of writing in with the certificate write-in apparatus 160.

As apparent from the descriptions above, for the low-level apparatus 20, having to store an individual public-key certificate in a process identical for the time of manufacturing at the plant and for the time of replacing a component commercially is enabled.

As described using FIGS. 6 and 7, in the low-level apparatus 20 configuring this communications system, an individual public-key certificate having been provided with the machine serial number information as apparatus-identifying information is stored. On the other hand, there is a demand that the serial machine number is to be provided for an apparatus having completed assembly and having passed a functional test. This is because providing the machine serial number before the test causes the machine serial number of an apparatus having failed the test to be a missing number, and the existence of such a missing number inconveniences subsequent product management efforts.

Thus, having to store a public-key certificate having been provided with the machine serial number information as apparatus-identifying information in the apparatus manufacturing step, while fulfilling the demand as described above, would inevitably be performed at the state such that all assembly steps have been completed. Then, in such a state, it is preferable to have the certificate stored via an interface being provided in the low-level apparatus 20 and being used normally than to have it stored using a special interface (a dedicated jig) as in the case of the common-certificate set. This is because, due to design or functional constraints, it is difficult to provide an end connection of the special interface in a position or a configuration such that it is easy to perform the tasks.

The low-level apparatus 20 described herein, enabled to write in an individual-certificate set via a network, enables, even after completion of the apparatus assembly, connecting to the certificate write-in apparatus 160 via a network-cable connecting interface being provided in the apparatus and performing a task of writing in the individual-certificate set. Thus, performing the task efficiently is enabled and the probability of causing damage, etc., in the apparatus during the tasks is extremely low. Moreover, in the write-in step encrypting of communications is enabled, enabling having the individual-certificate set to be stored in a secure manner.

It is noted that as the individual certificate and the common certificate differ in use and function, as illustrated in FIG. 12, these certificates preferably are issued by different CAs.

In other words, as the common certificate has the same one stored into all apparatuses of the same level, when there is a leakage of a common root-key, maintaining security becomes extremely difficult so that there arises a need to maintain especially strict privacy. On the other hand, there is no need to generate an individually different certificate per apparatus so as to have the certificate stored. Thus, placing prime importance on security, a CA that is unable to be accessed from outside may be used.

On the other hand, as the individual certificate may be updated as needed, even when there is a leakage of an individual root-key, updating the certificate enables maintaining security. Then, as there is a need to individually generate a certificate per apparatus so as to have the certificate stored, a CA being connected to an open network such as the Internet may be used.

It is to be noted that CAs may be further classified according to the level of the subject apparatus of issuance of certificate, such as a CA for issuing a certificate for the low-level apparatus, and a CA for issuing a certificate for the high-level apparatus.

Moreover, it is possible to use a digital certificate having an entirely different format for an individual certificate and for a common certificate.

Figure 14:
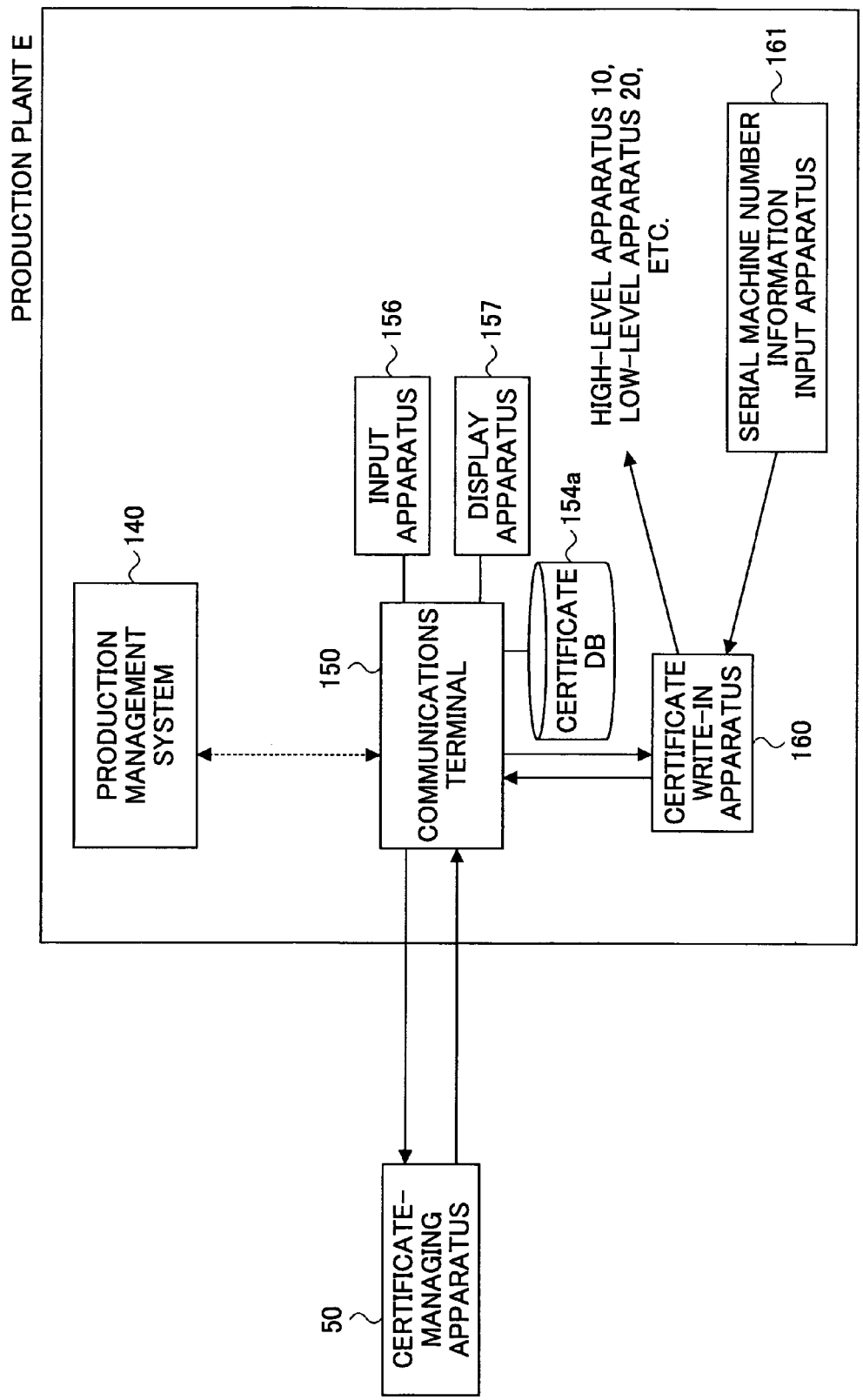
FIG. 14 is a diagram illustrating an overview of a facility for use in setting into the low-level apparatus the individual certificate set in a product assembly step as illustrated in FIGS. 11 and 12.

Next, a facility for use in setting into the low-level apparatus 20 an individual-certificate set in the product-assembly step as described above is described. FIG. 14 is a block diagram illustrating the overview configuration.

As illustrated in FIG. 14, in a production plant E for performing the product-assembly step, as a facility for setting an individual-certificate set, a production management system 140, a communications terminal 150, and a certificate write-in apparatus 160 are provided.

Then, the production management system 140 manages the number of units produced day-to-day of an apparatus such as the high-level apparatus 10 and the low-level apparatus 20.

The communications terminal 150 is provided with a certificate database (DB) 154a, an input apparatus 156, and a display apparatus 157. Then, from the production management system 140 information on the number of units produced per machine type for the day and machine serial number to be assigned (herein information including machine-type code and serial number) is obtained. Moreover, based on the information, the certificate-managing apparatus 50 that is a CA for issuing an individual public-key certificate is made to issue an individual-certificate set to be stored in an apparatus to be produced, the issued set being obtained so as to be stored in the certificate DB 154a.

The certificate write-in apparatus 160, being provided with a machine serial number information input apparatus 161, accepts input of the machine serial number of the apparatus in production from the machine serial number information input apparatus 161. Then, when this is input, a certificate corresponding to the machine serial number is obtained from the communications terminal 150, and the obtained certificate is transmitted to the corresponding apparatus so as to be set in an individual-certificate set storage-area being provided in a non-volatile memory of the apparatus. When producing the low-level apparatus 20, the certificate is set in a storage area being provided in the component A.

Figure 15:
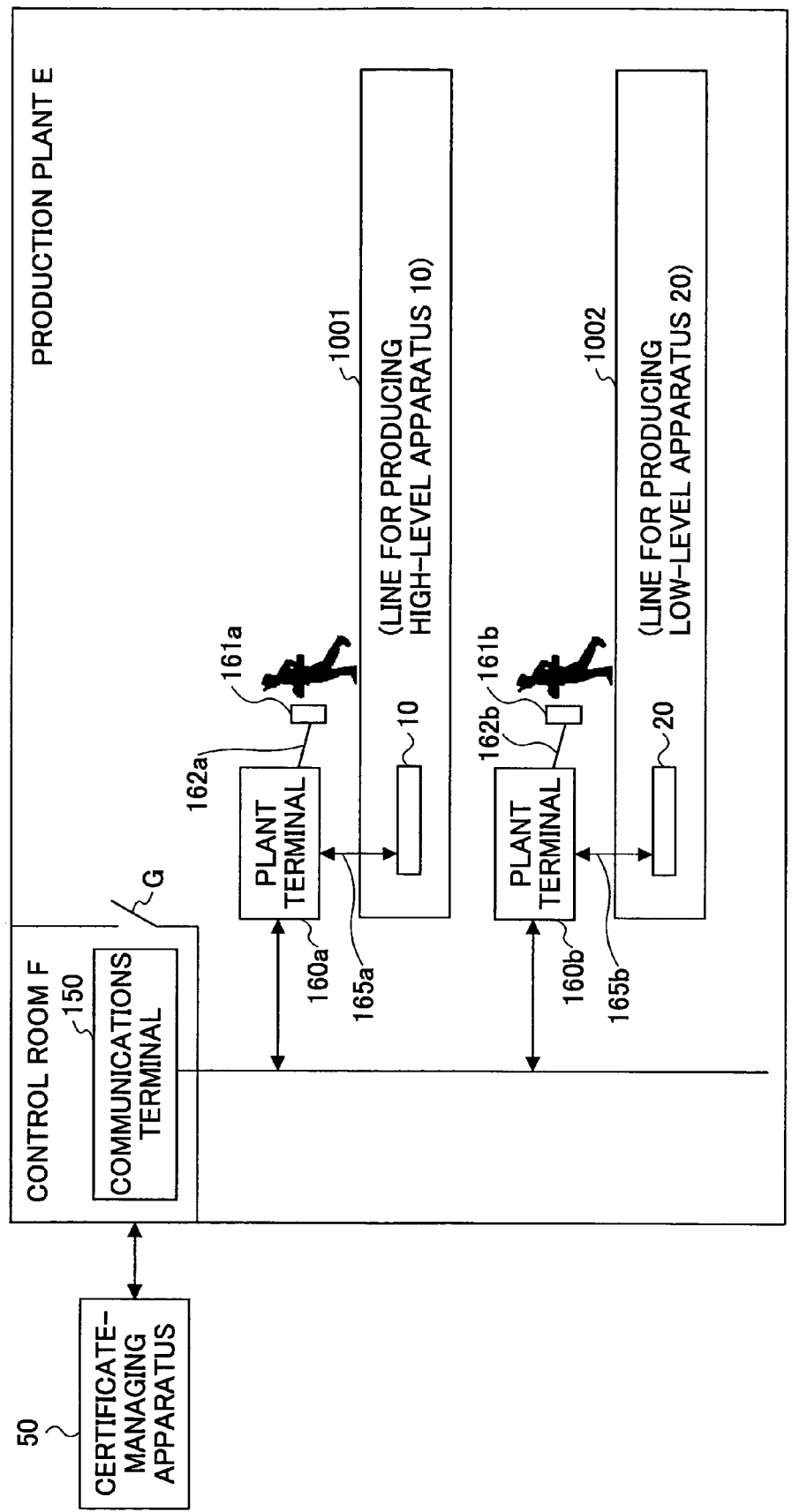
FIG. 15 is a diagram illustrating an overview of the state of the surroundings of a communications terminal and a certificate write-in apparatus as illustrated in FIG. 14, in a production plant.

Next in FIG. 15 an overview of the state of the surroundings of a communications terminal 150 and a certificate write-in apparatus 160 in a production plant E is illustrated.

In the production plant E, the communications terminal 150 is located at a control room F for security considerations. Then, the control room F has a door G to be locked so that only specific administrators may enter and the communications terminal 150 is enabled to be operated only when a specific ID and password are input.

Moreover in this example, the production plant E is provided with a line 1001 for producing the high-level apparatus 10 and a line 1002 for producing the low-level apparatus 20. Then, a certificate write-in apparatus 160 (160a, 160b) is provided for each of the lines for producing.

Then each of the certificate write-in apparatuses 160 is respectively connected to an interface 162 (162a, 162b) for machine serial number information input for connecting to a machine serial number input apparatus 161 (161a, 161b) and an interface 165 (165a, 165b) for writing in for connecting to an apparatus to be produced (a high-level apparatus 10 and a low-level apparatus 20).

In such a production line, for example when producing the low-level apparatus 20, at the time of assigning an identification number to an apparatus having passed a functional test, a rating plate is mounted. An example of the rating plate illustrated in FIG. 16 is provided with information such as a voltage rating, and a power-consumption rating, etc., as well as a machine serial number of the apparatus. Then furthermore, a bar code BC indicating information on the machine serial number is provided.

Then, in a step of setting an individual-certificate set, first as an interface for writing in 165 using a cross cable the certificate write-in apparatus 160 and a low-level apparatus 20 that is a subject of setting are connected. The cross cable is used because each apparatus to be produced has the same IP address as the initial value so that connecting via LAN with the certificate write-in apparatus 160 would cause an overlapping of the IP addresses.

Next, using a bar-code reader as the machine serial number information input apparatus 161, the bar code BC on the rating plate is read so as to input into the certificate write-in apparatus 160 machine serial number information of the subject apparatus of the tasks. Then, the certificate write-in apparatus 160 obtains a certificate corresponding to the machine serial number from the communications terminal 150, transmits the certificate to the low-level apparatus 20 being connected via an interface for write-in 165 so as to set the transmitted certificate in an individual-certificate set storage area being provided in the component A of the apparatus.

The tasks and the processes as described above enable making an individual public-key certificate having provided the machine serial number information as the apparatus-identifying information to be stored in simple tasks.

It is noted that, in the embodiment as described above, an example of performing authentication according to the SSL as described using FIGS. 18 and 20, between each apparatus such as the high-level apparatus 10 and the low-level apparatus 20 is described. However, the embodiment demonstrates the advantages even when the authentication is not necessarily performed in such a manner.

As a matter of course, the embodiment is applicable for a case of performing an authentication process according to the protocol TLS (Transport Layer Security), which is also known for having improved upon the SSL.

Moreover, in the embodiment as described above, while an example of using an individual certificate being provided with apparatus-identifying information, and a common certificate not being provided with apparatus-identifying information are described, the former may be regarded as a certificate with a high degree of security strength, whereas the latter may be regarded as a certificate with a low degree of security strength.

Generally, it may be difficult for a certificate with a high degree of security strength to be stored in all apparatuses in the same manner so as to be used in an authentication process, as there may be a need for providing a large number of information items, or there may be export limitations or special authentication-process programs may be needed. On the other hand, a certificate with a low degree of security strength may have few such limitations so that it may be relatively easily stored in all apparatuses in the same manner so as to be used in the authentication process.

Thus, there is a demand for manufacturing and marketing an apparatus having stored a certificate with a low degree of security strength, so as to enable having to store after the fact a certificate with a high degree of security strength depending on the usage environment. In such a case, using a configuration of the embodiment as described above, provided with a storage area for storing a certificate with a high degree of security strength and a storage area for storing a certificate with a low degree of security strength, in a replacement component as a minimum unit enabled for replacement, enables preventing having a certificate with a high degree of security strength invalidly obtained and reducing the danger of disguising, etc., so as to maintain communications with a high degree of security.

Moreover, while in the embodiment as described above, an example of having provided a certificate-managing apparatus 50 separately from a high-level apparatus 10 is described, providing the apparatuses as described above collectively is not prevented. In this case, components such as a CPU, a ROM, a RAM, etc., for implementing the functions of the certificate-managing apparatus 50 may be provided independently, using a CPU, a ROM, and a RAM, etc., of a high-level apparatus 10 and having the CPU to execute suitable software so as to be function as a certificate-managing apparatus 50.

In such a case, it is assumed that communications between the certificate-managing apparatus 50 and the high-level apparatus 10 in the same collective unit as the certificate-managing apparatus 50 includes a process for making the hardware to function as the certificate-managing apparatus 50, and an inter-process communications with a process for making the hardware to function as the high-level apparatus 10.

Moreover, in the embodiment as described above, while an example of the certificate-managing apparatus 50 itself generating a root key and a digital certificate is described, the certificate-managing apparatus 50 performing dedicated management of the key and the certificate and having to receive a supply of the root-key and the digital certificate from other apparatuses so as to obtain the received key and certificate is possible.

Furthermore, in the embodiment as described above, while a communications system is configured with only the high-level apparatus 10 and the low-level apparatus 20, the configuration may be include other apparatuses. For example, a transfer apparatus for transferring communications between the high-level apparatus 10 and the low-level apparatus 20 may be provided, so that the high-level apparatus 10 and the low-level apparatus 20 receive a request or a response via the transfer apparatus. Alternatively a further high-level apparatus may be provided further above the high-level apparatus 10. In this case, positioning the high-level apparatus 10 as "a low-level apparatus" and the further high-level apparatus as "a high-level" apparatus enables handling these apparatuses in the same manner as the embodiment as described above.

Also, up to now, with image-processing apparatuses such as a printer being provided with a communications function, a facsimile apparatus, a digital copying machine, a scanner apparatus, a multi-functional digital machine, etc., being apparatuses to be controlled, a remote-control system is being proposed for remote-controlling the apparatuses to be controlled by means of a control apparatus enabled to communicate with these apparatuses to be controlled.

For example, while an image-processing apparatus being provided with image-forming means generally uses a photoreceptor-electrostatic process so as to perform image-forming on plain paper, in a mechanism for performing such photoreceptor-electrostatic process, the probability of trouble (an error) occurring is high, and furthermore due to the need for a periodic overhaul for maintaining the quality, a servicing organization for maintenance management is being adopted.

Then, for the purpose of reinforcing the maintenance management, a remote-control system with the image-forming apparatus as the apparatus to be managed is already being developed and operated such that a communications apparatus is provided inside or outside the image-forming apparatus, the image-forming apparatus and a control apparatus, being located in a servicing center (a control center), are connected via a public circuit (telephone circuit), and occurrence of trouble in the image-forming apparatus is reported to the control apparatus.

The embodiment as described above may be applicable to such a remote-control system, so that in this case, the apparatus to be controlled may be a low-level apparatus, and a control apparatus for controlling the apparatus to be controlled and an apparatus located within the user environment that compiles information from multiple apparatuses to be controlled may be a high-level apparatus.

When performing remote control, specifying of the apparatus to be controlled needs to be performed by means of communications often, as there is no operator for the control apparatus near the apparatus to be controlled. Then, a mechanism for guaranteeing that the apparatus specified by means of communications is surely that apparatus is needed. Thus, as described in the embodiment, the advantages of enabling easy operating of authentication using an individual public-key certificate are great.

It is noted that the subject of remote control is not limited to the image-processing apparatus so that it is possible for a communications apparatus having provided a communications function in various electronic apparatuses, such as networked consumer-electronic equipment, an automated vending machine, medical equipment, a power source, an air conditioner, a measuring system for gas, water supply, or electricity, etc., an automobile, an aircraft, or a general-purpose computer, to be the apparatus to be controlled. It is noted that, as a matter of course, the low-level apparatus 20 is not limited to the apparatus to be controlled in the remote-control system.

The present application is based on the Japanese Priority Applications No. 2004-211396 filed on Jul. 20, 2004 and No. 2003-321762 filed on Sep. 12, 2003, the entire contents of which are hereby incorporated by reference.

The invention claimed is:

1. An apparatus for communicating in a system which includes at least a high-level apparatus, and a plurality of low-level apparatuses, said apparatus being a low-level apparatus, comprising:
communicating means for communicating with a communications counterparty;
said communicating means comprising
means for providing an individual certificate set which includes an individual public key certificate that is a digital certificate being provided with information identifying said apparatus for communicating in order to receive an authentication by said communications counterparty when communicating, an individual private key corresponding to the individual public key certificate which is used by the apparatus for encrypting information, and an individual root key which is used to validate the communications counterparty, wherein the individual root key is the same root key used by the high-level apparatus and the other low-level apparatuses, and
means for communicating when having been authenticated with said individual certificate by the communications counterparty; and
the apparatus for communicating further comprising
at least one storage area for storing said individual certificate set and a common certificate set which includes a common public key certificate that is a digital certificate not being provided with apparatus identifying information and is the same common public key certificate for the other low-level apparatuses, a common private key corresponding to the common public key certificate which is used by the apparatus for encrypting information, and a common root key which is used to validate the communications counterparty and which is set to be the same for the other low-level apparatuses and different for the high-level apparatus, said common certificate set being used for storing a new individual public key certificate in the apparatus when the individual public key certificate is not stored on the apparatus, and said common certificate set being stored in a replacement component as a minimum unit enabled for replacement.

2. The apparatus for communicating as claimed in claim 1, said communicating means further comprising:
means for providing said common public key certificate in order to receive the authentication by the communications counterparty when communicating; and
the apparatus for communicating further comprising
individual-certificate setting means for obtaining said individual public key certificate from the communications counterparty via said communicating means when having been authenticated by the communications counterparty with said common public key certificate and storing the obtained individual public key certificate in said storage area.

3. The apparatus for communicating as claimed in claim 2, wherein said replacement component is a component configured to store said common public key certificate, and not store said public key individual certificate, before being installed into said apparatus for communicating.

4. The apparatus for communicating as claimed in claim 3, wherein said replacement component with said common public key certificate is configured to be used without depending on the information identifying said apparatus for communicating.

5. The apparatus for communicating as claimed in claim 1, wherein the identifying information being provided in said individual public key certificate is machine serial number information of said apparatus for communicating.

6. The apparatus for communicating as claimed in claim 1, wherein said authentication is to be performed with an authentication process according to a Secure Socket Layer (SSL) protocol or a Transport Layer Security (TLS) protocol.

7. A system for communicating, including a high-level apparatus, and low-level apparatuses, each of which is to be a communications counterparty of the high-level apparatus, a low-level apparatus comprising:
means for providing an individual certificate set which includes an individual public key certificate that is a digital certificate being provided with information identifying the low-level apparatus in order to receive an authentication by a communications counterparty when communicating, an individual private key corresponding to the individual public key certificate which is used by the low-level apparatus for encrypting information, and an individual root key which is used to validate the communications counterparty, wherein the individual root key is the same root key used by the high-level apparatus and the other low-level apparatuses; and communicating means for communicating when having been authenticated with said individual certificate by said communications counterparty; and at least one storage area for storing said individual certificate set and a common certificate set which includes a common public key certificate that is a digital certificate not being provided with apparatus-identifying information and is the same common public key certificate for the other low-level apparatuses, a common private key corresponding to the common public key certificate which is used by the low-level apparatus for encrypting information, and a common root key which is used to validate the communications counterparty and which is the same for the other low-level apparatuses and set to be different for the high-level apparatus, said common certificate set being used for storing a new individual public key certificate in the low-level apparatus when the individual public key certificate is not stored on the apparatus, and said common certificate set being stored in a replacement component as a minimum unit enabled for replacement.

8. The system for communicating as claimed in claim 7, said communicating means in the low-level apparatus further comprising:

means for providing said common public key certificate in order to receive the authentication by the communications counterparty when communicating; and the low-level apparatus further comprising individual-certificate setting means for obtaining said individual public key certificate from said communications counterparty via said communicating means when having been authenticated by the communications counterparty with said common public key certificate and storing the obtained individual public key certificate in said storage area.

9. The system for communicating as claimed in claim 8, wherein said replacement component is a component configured to store said common public key certificate, and not store said individual public key certificate, before being installed into the low-level apparatus.

10. The system for communicating as claimed in claim 9, wherein said replacement component having stored said common public key certificate is configured to be used without depending on the information identifying said low-level apparatus.

11. The system for communicating as claimed in claim 7, wherein the identifying information being provided in said individual public key certificate is machine serial number information of the low-level apparatus.

12. The system for communicating as claimed in claim 7, wherein said authentication is to be performed with an authentication process according to a Secure Socket Layer (SSL) protocol or a Transport Layer Security (TLS) protocol.

13. A method of setting, in an apparatus for communicating in a system which includes at least a high-level apparatus, and a plurality of low-level apparatuses, said apparatus being a low-level apparatus including communicating means enabled to communicate with a communications counterparty via said communicating means, an individual certificate set which includes an individual public key certificate that is a digital certificate being provided with information identifying said apparatus for communicating, an individual private key corresponding to the individual public key certificate which is used by the apparatus for encrypting information, and an individual root key which is used to validate the communications counterparty, wherein the individual root key is the same root key used by the high-level apparatus and the other low-level apparatuses, the method comprising:

installing into said apparatus for communicating a replacement component as a minimum unit enabled for replacement having been provided with at least a storage area for storing said individual certificate set and a common certificate set which includes a common public key certificate that is a digital certificate not being provided with apparatus-identifying information and is the same common public key certificate for the other low-level apparatuses, a common private key corresponding to the common public key certificate which is used by the apparatus for encrypting information, and a common root key which is used to validate the communications counterparty and which is the same for the other low-level apparatuses and set to be different for the high-level apparatus based on a group of authentication subjects to be distinguished, said common certificate set being used for storing a new individual public key certificate in the apparatus when the individual public key certificate is not stored in the apparatus; and having said apparatus for communicating to provide said common public key certificate in order to receive an authentication by said communications counterparty when communicating, and to obtain via said communicating means said individual public key certificate from the communications counterparty so as to have the obtained individual public key certificate stored in said storage area when having been authenticated with said common public key certificate by the communications counterparty.

14. The method of setting the individual public key certificate as claimed in claim 13, wherein said replacement component is configured to be used, without depending on the information identifying said apparatus for communicating.

15. The method of setting the individual public key certificate as claimed in claim 13, wherein the identifying information being provided in said individual public key certificate is machine serial number information of said apparatus for communicating.

16. The method of setting the individual public key certificate as claimed in claim 13, wherein said authentication is to be performed with an authentication process according to a Secure Socket Layer (SSL) protocol or a Transport Layer Security (TLS) protocol.

* * * * *